United States Patent
Iwamura

(10) Patent No.: US 7,716,588 B2
(45) Date of Patent: *May 11, 2010

(54) GRAPHIC USER INTERFACE FOR DIGITAL NETWORKS

(75) Inventor: Ryuichi Iwamura, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 878 days.

This patent is subject to a terminal disclaimer.

(21) Appl. No.: 11/188,172

(22) Filed: Jul. 21, 2005

(65) Prior Publication Data

US 2005/0257164 A1    Nov. 17, 2005

Related U.S. Application Data

(63) Continuation of application No. 10/065,207, filed on Sep. 25, 2002, now Pat. No. 6,957,396.

(60) Provisional application No. 60/344,556, filed on Oct. 18, 2001.

(51) Int. Cl.
  *G06F 15/177* (2006.01)
(52) U.S. Cl. ............... 715/736; 715/734; 715/771
(58) Field of Classification Search ......... 715/734–737, 715/771

See application file for complete search history.

(56) References Cited

U.S. PATENT DOCUMENTS

| | | | |
|---|---|---|---|
| 5,353,398 A | | 10/1994 | Kitahara et al. |
| 5,740,436 A * | | 4/1998 | Davis et al. ................ 713/1 |
| 5,793,366 A | | 8/1998 | Mano et al. |
| 5,883,621 A * | | 3/1999 | Iwamura ..................... 725/37 |
| 6,011,553 A | | 1/2000 | Komiyama |
| 6,031,528 A * | | 2/2000 | Langfahl, Jr. .............. 715/734 |
| 6,053,951 A | | 4/2000 | McDonald et al. |
| 6,272,672 B1 | | 8/2001 | Conway |
| 6,437,805 B1 | | 8/2002 | Sojoodi |
| 6,476,858 B1 * | | 11/2002 | Ramirez Diaz et al. ..... 348/159 |
| 6,822,663 B2 | | 11/2004 | Wang |
| 6,920,614 B1 * | | 7/2005 | Schindler et al. ........... 715/726 |
| 6,957,396 B2 | | 10/2005 | Iwamura |
| 7,080,392 B1 * | | 7/2006 | Geshwind ................... 725/34 |
| 7,490,293 B1 * | | 2/2009 | Humpleman et al. ....... 715/734 |
| 2001/0024233 A1 * | | 9/2001 | Urisaka et al. ............. 348/213 |
| 2002/0078293 A1 * | | 6/2002 | Kou et al. .................. 710/305 |
| 2002/0089531 A1 * | | 7/2002 | Hirasawa .................... 345/735 |
| 2002/0171763 A1 * | | 11/2002 | Stecyk et al. ............... 348/552 |

* cited by examiner

*Primary Examiner*—Ba Huynh
(74) *Attorney, Agent, or Firm*—Fitch, Even, Tabin & Flannery

(57) ABSTRACT

A graphical user interface for a network of content devices that includes two or more graphical representations of two or more respective content devices that are coupled to a content device network. Graphical representations of two or more content streams between the graphical representations of content devices have graphical indicia, and two or more content display windows are provided to display content. Displayed content is associated with respective graphical indicia of the content streams so as to inform a user viewing the graphical representation of the content streams that the content streams carry the displayed content. In variations, the graphical user interface includes a master menu box that includes a content source selection menu for selecting a source content device, a content directory displaying content available from the source content device and a destination menu for selecting a destination content device.

50 Claims, 17 Drawing Sheets

GRAPHIC USER INTERFACE FOR DIGITAL NETWORKS

CROSS REFERENCE TO RELATED APPLICATIONS

This is a continuation of U.S. application Ser. No. 10/065,207, filed Sep. 25, 2002, for GRAPHIC USER INTERFACE FOR DIGITAL NETWORKS, which is a nonprovisional of U.S. application No. 60/344,556, filed Oct. 18, 2001, for GRAPHIC USER INTERFACE FOR A DIGITAL AV BUS, which is incorporated herein by reference.

BACKGROUND OF INVENTION

1. Field of the Invention

The present invention relates generally to digital networks, and more specifically to control and feedback mechanisms for digital networks. Even more specifically, the present invention relates to graphical user interfaces for digital networks.

2. Discussion of the Related Art

Digital networking technology has advanced to a point that allows several digital content devices, e.g., hard disc drives (HDD), compact disc drives, digital video (DVD) drives, digital video recorders (DVCR), and digital video cameras to simultaneously transmit content streams. For example, under IEEE 1394 standards several content streams may be time-multiplexed over a single serial bus. Additionally, wireless local area networks allow several content streams to be simultaneously transmitted between content devices.

The advent of content devices, e.g., hard disc drives (HDD), that allow four or more audiovisual content streams to be independently handled at a time provides an enormous amount of flexibility to a user when coupled with the state of the art digital networking.

Although the state of digital networking and content devices provide a lot of flexibility, users cannot see content that is communicated over either wired or wireless networks, and thus, users are often unable to determine what transmissions are taking place. Furthermore, users are often unable to fully utilize capabilities of a digital network because they do not have an effective interface to control several content streams between several content devices in a digital network.

SUMMARY OF INVENTION

In one embodiment, the invention can be characterized as a graphical user interface method and a graphical and a computer readable medium with instructions encoded therein for implementing the method. The method includes playing a plurality of graphical representations of a plurality of respective content devices coupled to a content device network, providing a graphical representation of a first content stream between a first set of the plurality of graphical representations of content devices wherein the graphical representation of the first content stream includes a first graphical indicia, generating a first content display window for providing displayed content wherein the displayed content is associated with the first graphical indicia so as to inform a user viewing the graphical representation of the first content stream that the first content stream carries the displayed content, providing a graphical representation of a second content stream between a second set of the plurality of graphical representations of content devices wherein the graphical representation of the second content stream includes a second graphical indicia and generating a second content display window for providing another displayed content wherein the other displayed content is associated with the second graphical indicia so as to inform the user viewing the graphical representation of the second content stream that the second content stream carries the other displayed content.

In another embodiment, the invention can be characterized as a graphical user interface for a network of content devices. The graphical user interface includes a plurality of graphical representations of a plurality of respective content devices coupled to a content device network, a graphical representation of a first content stream between a first set of the plurality of graphical representations of content devices that includes a first graphical indicia. The graphical user interface also includes a first content display window for providing displayed content that is associated with the first graphical indicia so as to inform a user viewing the graphical representation of the first content stream that the first content stream carries the displayed content. The graphical user interface additionally includes a graphical representation of a second content stream between a second set of the plurality of graphical representations of content devices that includes a second graphical indicia, and a second content display window for providing another displayed content that is associated with the second graphical indicia so as to inform the user viewing the graphical representation of the second content stream that the second content stream carries the other displayed content.

BRIEF DESCRIPTION OF DRAWINGS

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION

The following description is not to be taken in a limiting sense, but is made merely for the purpose of describing the general principles of the invention. The scope of the invention should be determined with reference to the claims.

Figure 1:
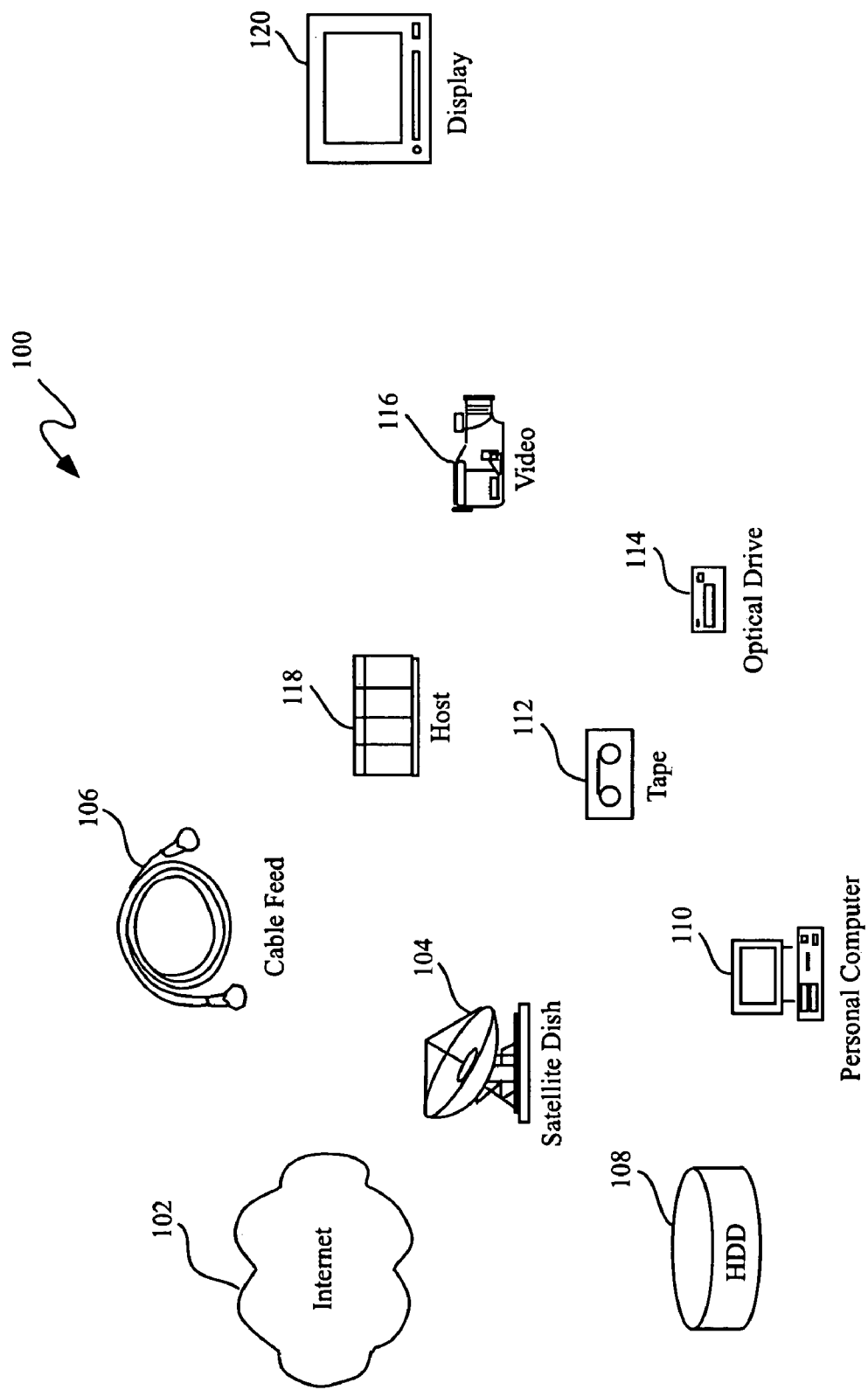
FIG. 1 is a diagram illustrating a content device network.

Referring first to FIG. 1, shown is a diagram illustrating a content device network. Illustrated is the content device network 100 including the following seven content devices: an internet feed 102, a satellite feed 104, a cable feed 106, a hard drive 108, a personal computer 110, a digital video recorder 112, an optical disk player 114, a digital video camera 116, and a host device 118. Also shown is a display 120.

The content devices are coupled to one another via the content device network 100 and the display 120 is also coupled to the content device network 100. The display 120 in several embodiments is an ordinary television; however, a high definition television (HDTV) or a PC monitor (such an a cathode ray tube monitor or liquid crystal display monitor) is preferred.

In operation, the content devices are available for providing content at the display 120 for viewing and/or listening by a user. As referred to herein, "content" generally refers to information. For example, in several embodiments, the content is audiovisual content that comprises digital information that is used to construct an audiovisual display on the display 120. The content, however, may be, for example, solely audio or solely video content.

Figure 2:
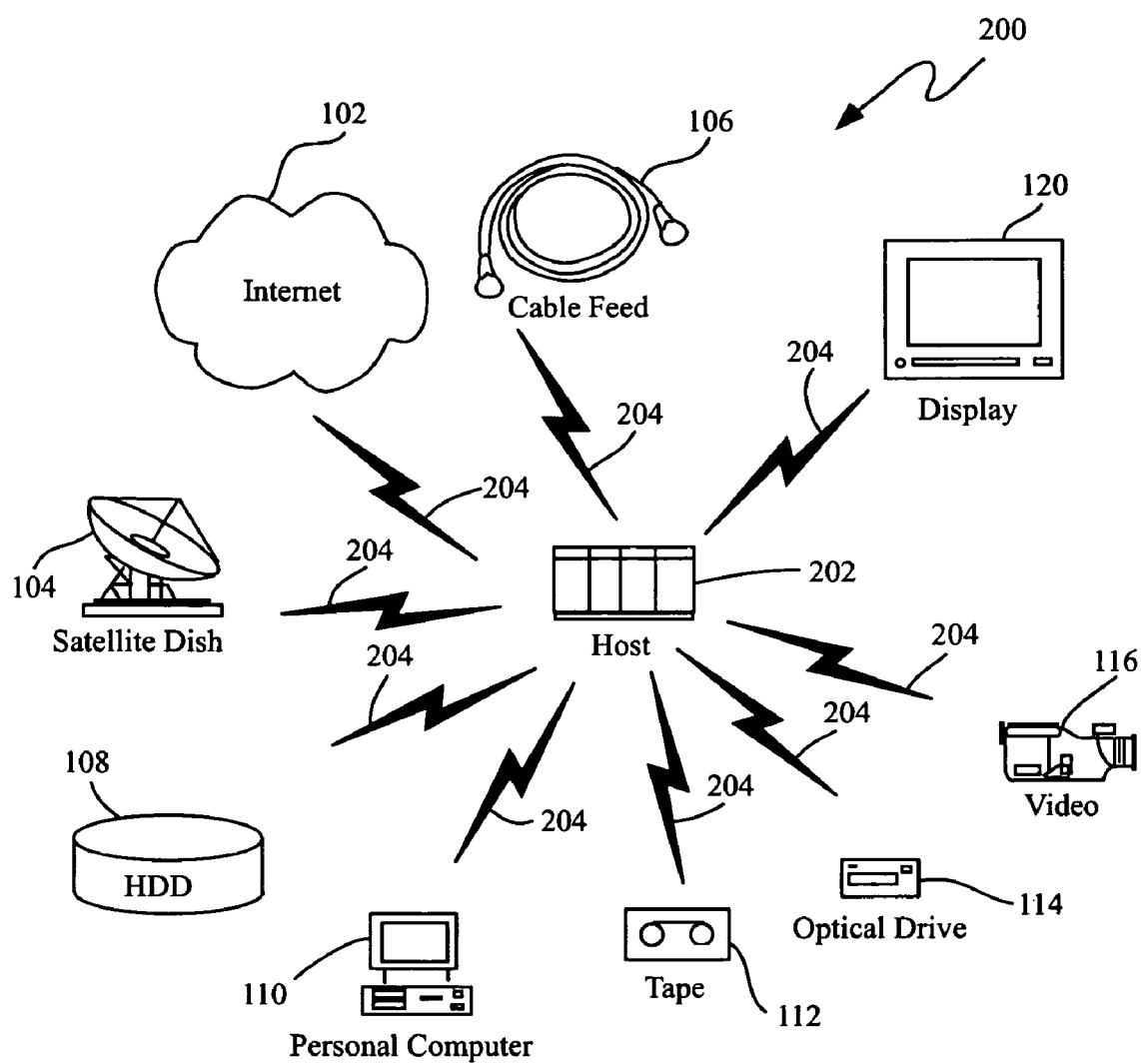
FIG. 2 is a is a diagram illustrating one embodiment of the content device network of FIG. 1 implemented with a star topology.

In general, the content devices are providers of content, however, it should be recognized that some content devices, e.g., the internet feed 102, cable feed 106 and satellite feed 104 are generally read only content devices that are not content storage devices per se. Other content sources, for example the hard drive 108, digital video recorder 112, optical disk drive 114, and the digital video camera 116 are generally both readable and writable, i.e., are content storage devices The content device network 100 is the collection of content devices that are interconnected by communication paths. It should be recognized that the topology, the spatial distance between content devices, the physical links between content devices and/or the host, and the type of data transmission technology used within the content device network 100 may vary within the scope of the present embodiment For example, referring to FIG. 2, shown is a diagram illustrating one embodiment of the content device network of FIG. 1 implemented with a star topology. Shown are the content devices described with reference to FIG. 1 arranged in a circle formation around a host 202. Communication paths 204 are also shown between each content device and the host 202 as well as between the display 120 and the host 202. In several embodiments, the host 202 acts as an access point for the content devices wherein content that is transmitted from a content device is routed through the host 202 before being sent on to another content device and/or to the display 120.

In several embodiments, the content device network 200 is a wireless indoor (or indoor/outdoor) local area network based on, for example, IEEE 802.11a, IEEE 802.11b, Bluetooth or the HiperLAN2 standards. In several other embodiments, the communication channels 204 are implemented with conductors including coaxial, twisted pair wiring, and/or optical coupling.

Figure 3:
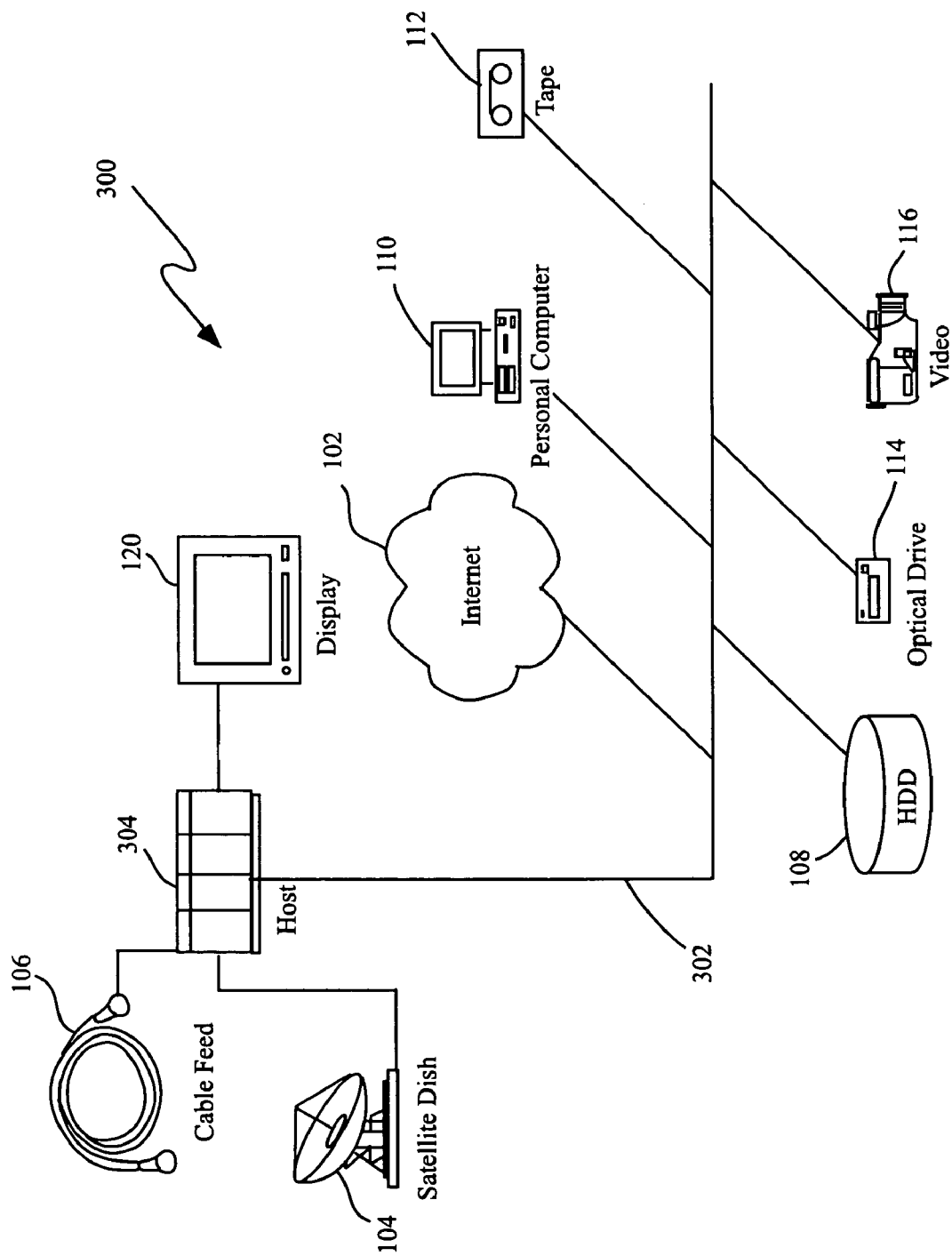
FIG. 3 is a diagram illustrating yet another embodiment of the content device network of FIG. 1 implemented with a bus topology.

As another example, referring to FIG. 3, shown is a diagram illustrating yet another embodiment of the content device network of FIG. 1 implemented with a bus topology. Shown is a content device network 300 that includes the cable feed 106 and a satellite feed 104 coupled with a host 304. Also shown in the content device network 300 are a hard drive 108, an internet feed 102, a personal computer 110, an optical drive 114, a digital video recorder 112, a digital video camera 116 and a host 304 attached to a communication bus 302.

In one embodiment, the communication bus 302 and the content devices operate in accordance with IEEE-1394 protocols with content streams transmitted as isochronous streams. In another embodiment, content streams may be communicated as asynchronous streams, e.g., an IP over IEEE 1394 stream. Embodiments of the present invention, however, are not limited to IEEE 1394 protocols, e.g., In another embodiment, the communication bus 302 is an IDE internal bus.

As shown, the satellite feed 104 and cable feed 106, according to one embodiment, are not coupled directly to the communication bus 304 as are other content devices, but instead, signals from the satellite feed 104 and cable feed 106 are fed to the host 304 where the host 304 tunes and demodulates received signals. The host 304 then relays the signals from the satellite feed 104 and or cable feed 106 to the display 120 and/or the other content devices. In contrast, the other content devices are coupled directly to the communication bus 302.

While two particular embodiments of the content device network 100 are presented (i.e., content device networks 200 and 300 of FIGS. 2 and 3 respectively), it should be recognized that the content device network 100 need not be any particular configuration, and may be, for example, configured with a token ring topology, or any other topology or scheme for networking devices capable of communicating a content stream from one content device to another Typically, the content device network 100 is a local area network, however, the spatial distance between devices may vary depending upon the particular application. Additionally, the data transmission technology utilized within the content device network 100 may vary and may be, for example, a TCP/IP, a Systems Network Architecture Network, or an ATM (asynchronous transfer mode) network. It should be recognized, however, that the present embodiment is compatible with any type of data transmission technology utilized by the content device network 100.

In several embodiments, as shown if FIG. 3, the host 304 is a device that is coupled to each of the content devices in order to monitor and/or control the content devices. In some embodiments, the host 304 is a central access point through which all content provided on the display 120 flows. In other embodiments, the host 304 only controls the flow of content between content devices and does not necessarily carry any content at all. It should be recognized that, for purposes of this invention, the host 304 need not be a separate device, and may, for example, be integrated with one or more of the content devices or the display 120.

In several embodiments, the content device networks 100, 200, 300 and the communication bus 302 allow several audio and/or video streams to be transmitted simultaneously between two or more content devices. For example, a user is able to record content received from the satellite feed 104 with the hard drive 108 while content from the digital video camera 116 is transferred to the digital video recorder 112.

In some embodiments, content from more than one content device may be transmitted to a single receiving content device. For example, hard drives are now available that may handle four or more digital content streams independently at a time. Thus, unlike a legacy analog device, for example, a VHS VCR which only records or plays back one program, a user is able to record a first and a second content selection, e.g., from the cable feed 106, to the hard drive 108 while two other stored programs are simultaneously played back from the hard drive 108 to the display 120.

Additionally, in some embodiments, several content streams may be communicated over a single same communication bus. For example, in accordance with IEEE 1394 protocols, several content streams are time multiplexed over a single communication bus, e.g., communication bus 302. When there are multiple signals communicated over a single bus, however, it is difficult for the user to associate a signal with content the signal is carrying. Similarly confusing to a user are content streams communicated over a wireless network, e.g., content device network 200.

Problematically, the flexibility provided the user to control several content streams also makes it hard for the user to know what content devices are receiving and/or sending content at any given time. Furthermore, it is difficult for the user to know what the subject matter is of each of the several content streams.

Figure 4:
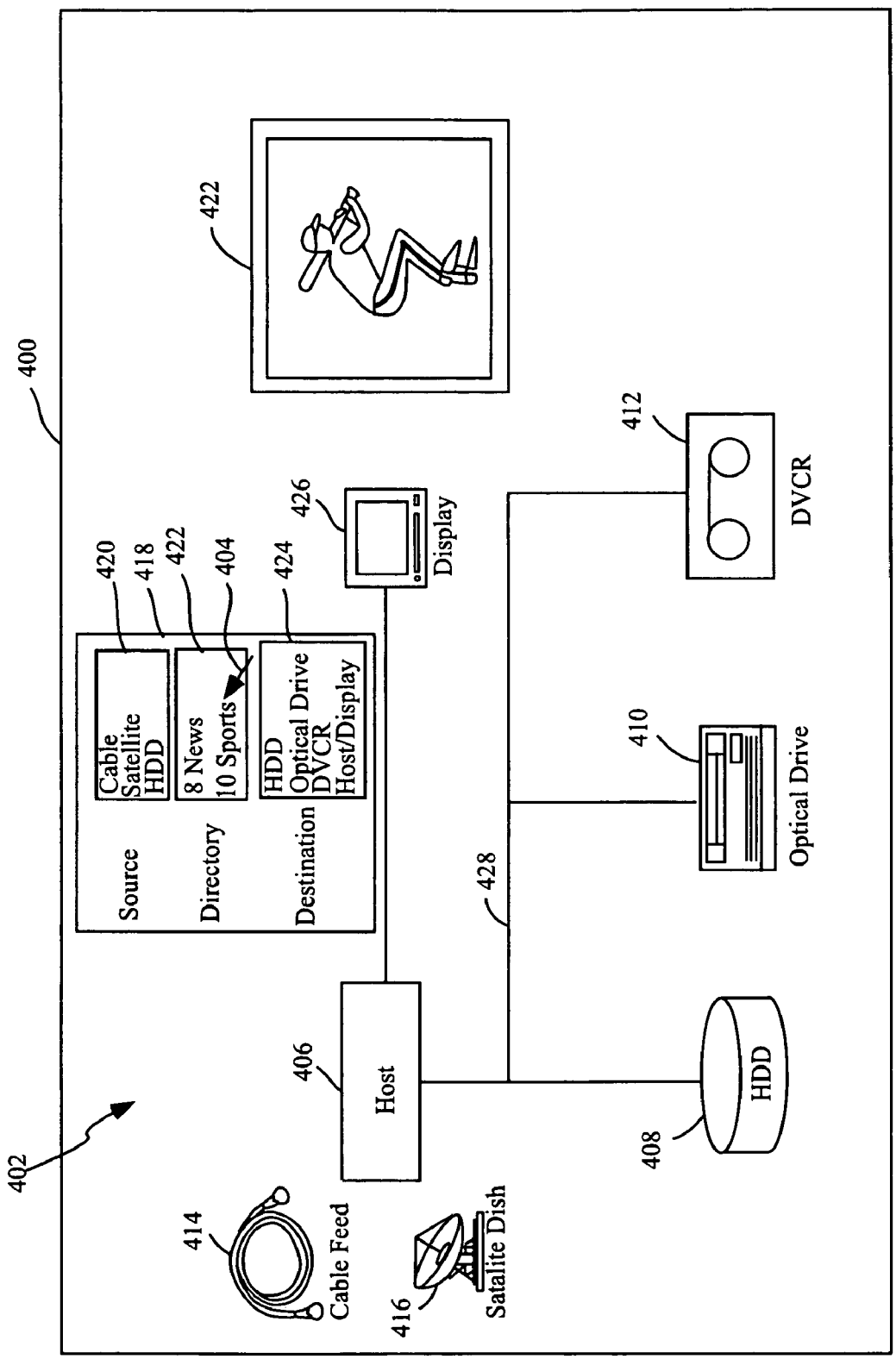
FIG. 4 is a diagram illustrating one embodiment of a graphical user interface for the content device networks of FIG. 3.

Referring next to FIG. 4, shown is a diagram illustrating one embodiment of a graphical user interface for the content device network of FIG. 3.

Shown is a display area 400, and shown within the display area 400 is a graphical user interface 402 that includes a cursor 404, a host icon 406 (i.e., a graphical representation of the host 304), a display icon 426, a collection of content device icons that include a hard drive icon 408, an optical disc drive icon 410 (also referred to herein as an optical drive icon 410) and a digital video recorder (DVCR) icon 412. Also shown is a cable feed icon 414 and a satellite feed icon 416. Additionally, a master menu box 418 is shown, and within the master menu box 418 is a content source selection box 420 that has a content source selection menu, i.e., a list of content devices that are available sources of content. Additionally, within the master menu box 418, is a content directory box 422 and shown within the content directory box 422 is a content directory, i.e., a partial listing of available content for the cable feed 106. Also within the master menu box 418 is a destination box 424 that includes a destination menu, i.e., a list of content devices that may receive content. Additionally, a content display window 422, and a bus representation 428 are shown within the display area 400.

In several embodiments, the display area 400 is the screen of the display 120, e.g., a television, a display on a hand held remote control device, a host display, a computer screen or other displays on consumer electronics devices. Thus, various embodiments of the graphical user interface, as described further herein, may be applied to a personal computer or other digital products.

The content device icons are graphical representations that correspond to content devices that are a part of the content device network 300. Thus, in several embodiments, the graphical user interface 402 is a graphical representation of at least a portion of the content device network 300.

The master menu box 418 is an interface that allows the user to select a particular source or piece of content from a particular content device and send the particular source or piece of content to a particular destination.

Specifically, within the master menu box 418 is the content source selection box 420. The content source selection box 420 provides a content source selection menu, i.e., a selectable listing of content devices that are available in a content device network 300. As shown in FIG. 4, the cable feed 106 the satellite feed 104 and the hard drive 108 are available for the user to select in the content source selection menu. It should be recognized, however, that any content device that is a provider of content may be listed in the content source selection box 420. In the present embodiment, the cable feed 106 is shown as a selected source content device by bold text, however, a selected source content device may be shown by numerous techniques, for example, a selected source content device may be displayed alone in the content source selection box 420 once it is selected.

Also within the master menu box 418 is a content directory box 422 that contains a directory of content for a selected source content device. For example, as shown in FIG. 4, a directory of channels, i.e., channel "8 news," and channel "10 sports," that are available from the cable feed 106 are shown. In several embodiments, and as shown in FIG. 4, the content directory for the cable feed 106 includes channel listings that include channel numbers along with an indication of the subject matter for each channel number. While only two available channels are shown for the cable feed 106, it should be recognized that there are potentially hundreds or more channels that may available from the cable feed 106. In other embodiments, the content directory box 422 contains information about content providers, e.g., television networks and/or television call letters, which are associated with the displayed channel numbers.

Figure 8:
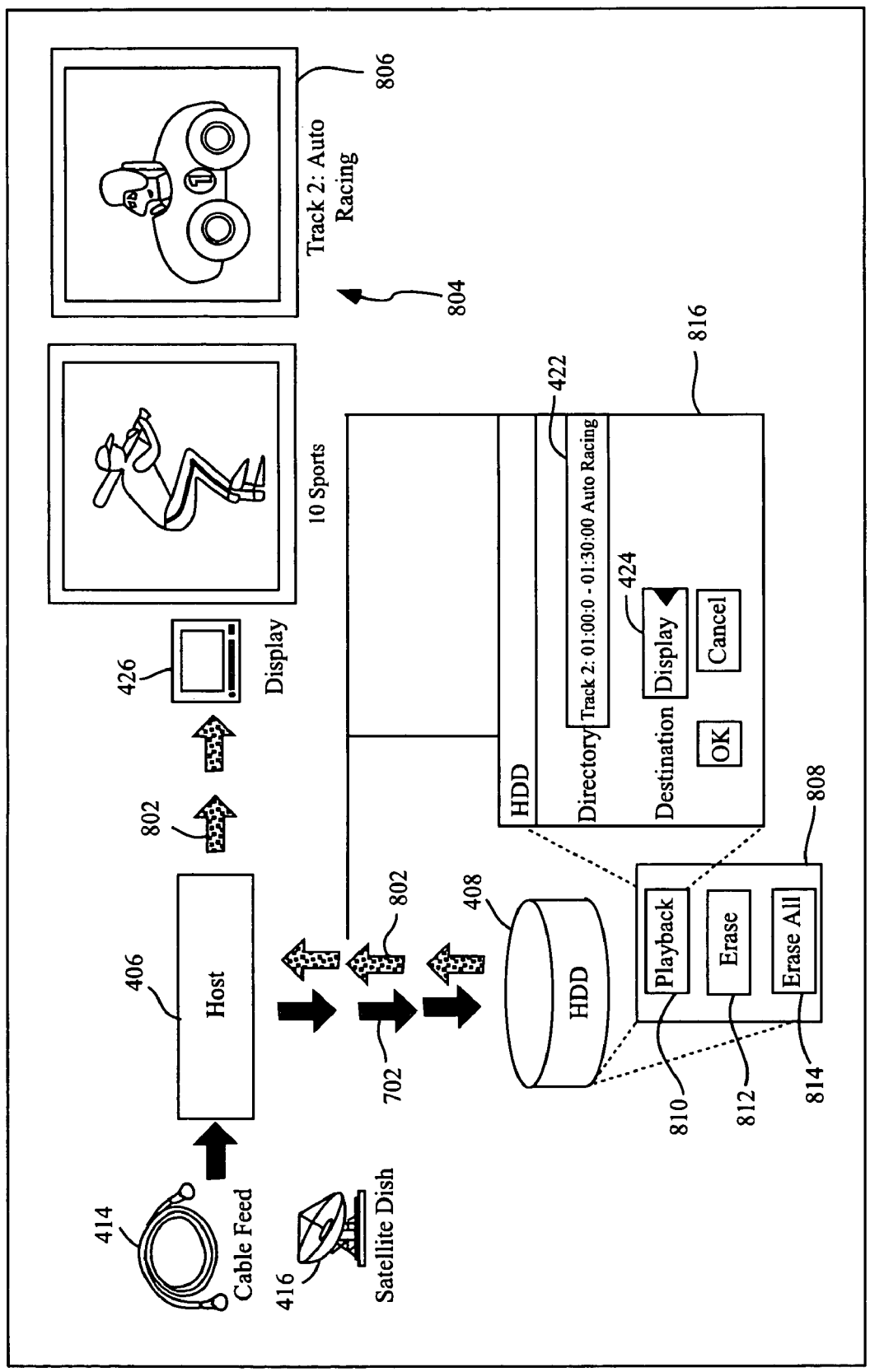
FIG. 8 is one embodiment of the graphical user interface of FIG. 7 after the user has initiated a second content stream.

It should also be recognized, as discussed further with reference to FIG. 8, that listings in the content directory box 422, according to several embodiments, are tailored for a specific content device, so that, for example, if the hard drive 108 is selected by the user as a source content device, a listing of content by track on the hard drive 108 may be provided.

The destination box 424 allows a user to select a particular content device as a destination for particular content selected from a particular selected source content device. In several embodiments, the content destination box 424 includes a destination menu of potential destination content devices that may receive content from the selected source content device. For example, as shown in FIG. 4, potential destination content devices include the hard disk drive (HDD) 108, the optical drive 114, the display 120 and the digital video recorder (DVCR) 112. It should be recognized that this list is only exemplary and that numerous writeable content devices that are a part of the content device network 300 may be listed in the destination menu as a destination content device.

Figure 5:
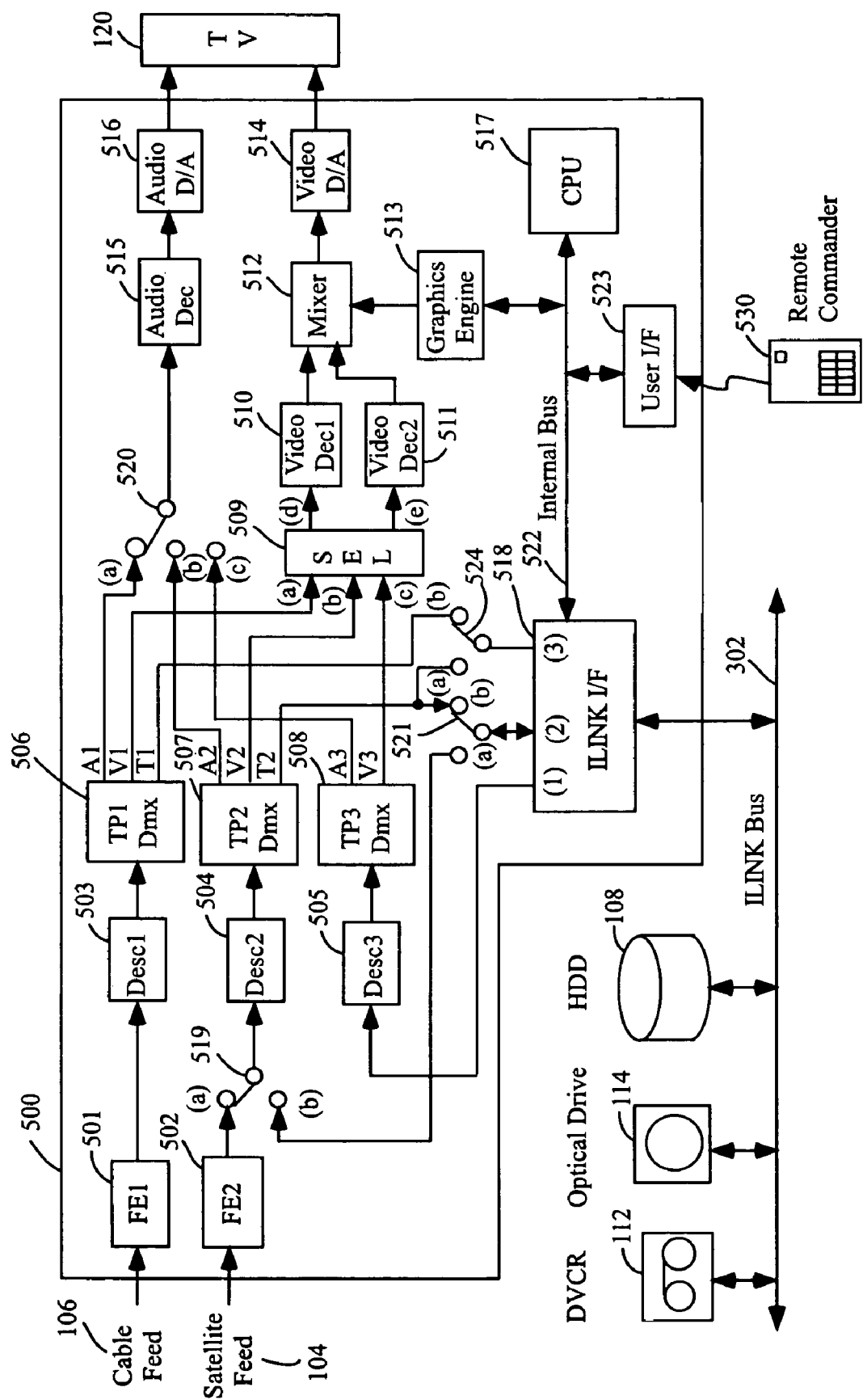
FIG. 5 is a functional block diagram of one embodiment of functional components making up the host of FIG. 3.

In operation, according to several embodiments, the user initiates a display of the master menu box 418 by directing the cursor 404 to the host icon 406 and clicking on the host icon 406, e.g., with a remote controller as discussed further with reference to FIG. 5. Once the master menu box 418 is displayed, the user then selects a source content device from the content source menu 420. In response to selecting a source content device in the content source menu 420, a content directory menu of available content is provided in the content directory box 422 that reflects content available from the source content device. The user then selects a program, e.g., a channel, from the content directory menu, and then selects a destination for the program from the destination menu in the destination box 424.

It is noted that one of ordinary skill in the art recognizes that the menus in the content source selection box 420, the content directory box 422 and the destination box 424 may be implemented as a pull-down type of menus or scroll type menus.

Additionally, in other embodiments, the master menu box 418 does not have a destination box 424, and instead of selecting a destination content device from a listing of content devices, the user is able to click on a selection in the content directory box and drag and drop the selection to a desired content device icon.

The content display window 422 is an area within the larger display area 400 for displaying content of a content stream in the content device network. In other words, the content display window 422 is an area where the user is able to view video or audiovisual content of a particular content stream. Advantageously, the content display window 422 allows the user to quickly identify subject matter of content available from a particular content device. For example, as shown in FIG. 4, the content display window 422 shows the subject matter of the "10 Sports" channel, i.e., a baseball game, in response to the user pointing the cursor to the "10 Sports" text.

It should be recognized that the graphical user interface of the present invention is not limited to the particular embodiment illustrated in FIG. 4. Specifically, the graphical user interface need not emulate the actual physical configuration of content devices as long as the graphical user interface facilitates the user determining which content devices are communicating with one another.

In several embodiments, however, a graphical user interface is configured so that the layout of the content device icons resembles the network architecture of the content device network. For example, in one embodiment, where a content device network is configured with a star topology, the graphical user interface displays the content devices in much the same way as the content devices in FIG. 2 are represented, i.e., with the host icon 406 surrounded by the content devices.

It should also be recognized that the particular content devices shown in FIG. 4 are exemplary only and that other content devices may be graphically represented in the graphical user interface as well.

Referring next to FIG. 5, shown is a functional block-diagram of one embodiment of functional components making up the host of FIG. 3. As shown, the host 500 is coupled at a host interface module 518 with a communication bus 302 of a content device network 300. The host 500 is also coupled with to a cable feed 106 and a satellite feed 104 at a first front end module (FE1) 501 and a second front end module (FE2) 502 respectively. All functional blocks in the host 500 are controlled by a central processing unit (CPU) 517 and are coupled to the CPU 517 via an internal bus 522 (for simplicity the entire internal bus 522 is not shown). A display 120 is coupled with the host 500 to receive content from the front end modules 501, 502 and/or content devices, and signals making up a graphical user interface from the host 500. Thus, content displayed at the display 120 in this embodiment, is routed through the host 500. Furthermore, the host 500 implements a user's commands received with a remote commander 530 shown communicatively coupled with an I/F module 523 located within the host 500.

The user is able to move a cursor, e.g., cursor 404, about the display area 400 with the remote commander 530 by using, e.g., buttons or a control stick on the remote commander 530. In several embodiments, the remote commander 530 is operable like an ordinary mouse used with a personal computer, i.e., it allows a user to point a cursor to a graphic in the display area 400 and then select and/or click-and-drag the graphic. Advantageously, in several embodiments, the remote commander 530 has fewer buttons than a typical remote control because on screen menus, e.g., master menu box 418, in the graphical user interface eliminates the need for many buttons otherwise required.

In operation, when the cable feed 106 is selected, e.g., via the content source selection box 420 or by clicking on the cable feed icon 414, a signal from the cable feed 106 is tuned, demodulated and error corrected in the first front end module 501 to produce an output stream from the first front end module 501. The output stream is descrambled in the first descrambler 503 and is sent as a descrambled signal sent to the first TP1/Dmx 506. The first TP1/Dmx 506 parses the descrambled signal and sends program information data to CPU 517 through the internal bus 522. Based on the program information data, the CPU 517 commands the graphics engine 513 to generate a content directory menu, and the content directory menu is mixed with the video signals in the mixer 512 to generate a mixed signal. The mixed signal then leaves the mixer and is converted from digital to analog in a video digital to analog converter 514 and sent to the display 120. In several embodiments, the content directory menu is displayed in a content directory box, e.g., content directory box 422.

The graphics engine 513 provides graphics for the graphical user interface that are implemented with well known hardware and programming techniques. It is preferable, however, that software be written in a multi-platform language, e.g., Java.

When the user selects a program, e.g., by clicking on a channel listing in the content directory box 422, the user interface 523 receives a command signal from the remote commander 530, and the command signal is sent to the CPU 517 over the internal bus 522. The CPU 517 then obtains audio and video packet identification (PID) numbers from program information data, and the CPU 517 then sends a command to let the first TP1/Dmx 506 module know which PID is required. Each packet in a stream has a PID, and based on these PID numbers, the first TP1/Dmx module 506 passes necessary packets while all unnecessary packets are dropped. Filtered video packets leaving the TP1/Dmx module 506 designated as video stream V1 are sent to a first input (a) of selector 509. Similarly, filtered stream T1 from TP1/Dmx module 506, includes video packets, audio packets, and the data packets for program information. The filtered stream T1 is used for recording and is sent to the network interface module 518.

The second front end module 502 operates in the same manner as the first front end module 501. The second descrambler 504 operates in the same manner as the first descrambler 503 except that the second descrambler 504 receives content from either the satellite feed 104 (via the second front end module 502) or a content device (via the host interface module 518) coupled with the communication bus 302 depending upon the position of switch 519. The third descrambler 505 also operates in the same manner as the first descrambler 503 except that it receives content only from a content device coupled with the communication bus 302. The second and third TP2/Dmx modules 507, 508 operate in the same manner as the first TP1/Dmx module 506.

Filtered video packets designated as video streams V1, V2 and V3 from the TP1/Dmx, TP2/Dmx and TP3/Dmx modules respectively are forwarded to inputs designated as (a), (b), and (c) respectively of selector 509. The selector 509 is a three-to-two selector, i.e., one of the three inputs (a), (b), (c) and is connected with an output (d), and another of the three inputs (a), (b), (c) is assigned to output (e). A selected video stream from output (d) of the selector 509 is decoded in the first video decoder 510 and mixed in the mixer 512 with the graphics signal from the graphics engine 513, and another video signal (if present) from output of the selector 509 is provided to a second video decoder 511 and an output from video decoder 511 is also mixed with a graphics signal from the graphics engine 513. The mixed signals from the mixer 512 are converted from digital to analog in the video digital to analog video converter 514 and sent to the display 120.

An audio switch 520 is shown with three inputs (a), (b), (c) that are respectively coupled with audio output lines A1, A2 and A3 of the first, second and third TP/Dmx modules 506, 507, 508. The audio switch couples a selected one of output lines A1, A2 and A3 with an audio decoder 515 allowing an audio signal on the selected audio output line to be decoded by the audio decoder 515 and then converted from analog to digital in a digital to analog audio converter 516 before being sent to the display 120. In other embodiments, the host 500 includes two or more audio decoders and two or more respective digital to analog audio converters to allow multiple audio content streams to be monitored simultaneously.

The network interface module 518 has three ports (1), (2), (3). Port (1) is an output port, i.e., a content stream leaves the network input module 518 from port (1), and port (1) is coupled with the third descrambler 505. Port (2), in contrast, is a bi-directional (input/output) port. When port (2) is operating as an output port, a port selector switch 521 connects port (2) with terminal (b) of switch 519. When port (2) is operating as an input port, however, it receives stream T2 from the TP2/Dmx module 507. Port (3) is an input port. A port selector switch 524 connects port (3) and it selects stream T1 from the TP1/Dmx module 506 or stream T2 from the TP2/Dmx module 507.

Streams T1 and T2 respectively (if present) are received by the port (1) and port (2) and are sent out to the communication bus 302 via the network interface module 518. A content stream received by the network interface module from the communication bus 302 is output from the port (1) and/or port (2) to the second descrambler 504 or third descrambler 505 respectively.

In several embodiments, port (2) is not used until after either the first or third port is in use. This is done to prevent a potential restriction of content streams. For example, if the port (2) were to be put in use first, and then a user subsequently desired to have a content stream sent from the host 500 to the communication bus 302, port (3), an input port, would have to be used. This would leave only port (1), an output port, available, and thus, the host 500 would not be able to send anymore content streams, e.g., from the cable feed 106, to the communication bus 302. Thus, by retaining the second port (2) open until it is necessary to use it, the host 500 retains greater flexibility to handle a user's request.

As shown, switch 519 allows either content from the second front end module 502 or from the communication bus 302 via port (2) to be sent to the second descrambler 504.

One of ordinary skill in the art is able to implement graphics described with reference to FIG. 4 and FIGS. 7 through 16 in response to commands described herein using the host 500 and well known programming techniques. Thus, a further discussion of the hardware and programming in the host is not provided.

Figure 6:
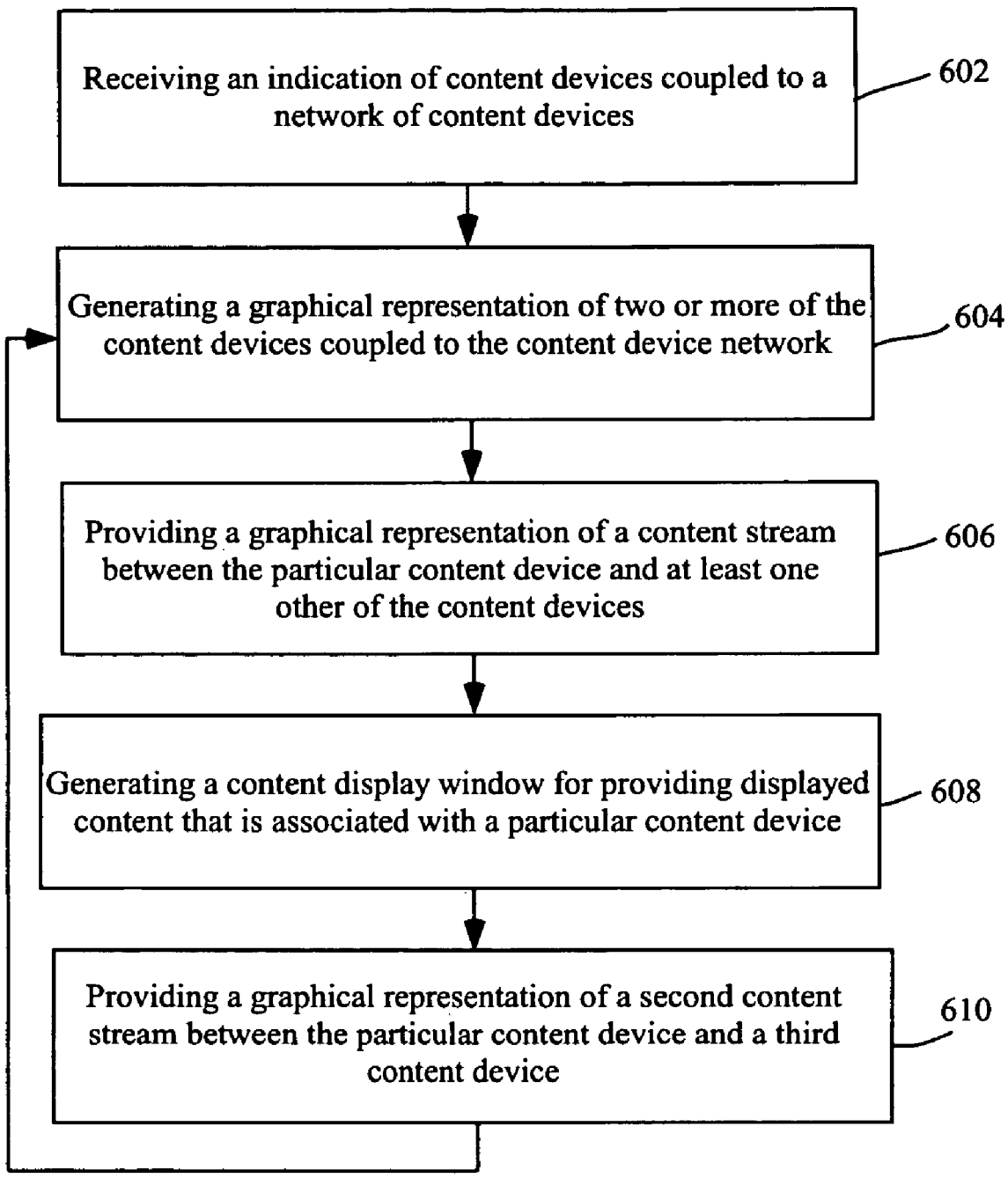
FIG. 6 is a flowchart illustrating one embodiment of steps implementing the graphical user interface carried out, in one embodiment, by the host content device of FIG. 5.

Referring next to FIG. 6, shown is a flow chart illustrating steps carried out, in one embodiment, by the host of FIG. 5 in producing a graphical user interface in accordance with one embodiment of the present invention.

In operation, according to one embodiment, when the host 500 is started up, the host 500 receives an indication of the content devices that are a part of the content device network (Step 602 of FIG. 6). Details of a bus initialization process in accordance with IEEE 1394 standards are detailed in U.S. Pat. No. 5,883,621 entitled. DEVICE CONTROL WITH TOPOLOGY MAP IN A DIGITAL NETWORK to Iwamura, which is incorporated herein by reference. One of ordinary skill in the art recognizes that several network communication protocols, including IEEE 1394, provide for the addition and removal of content devices at any time without having to reboot the host 500. Thus, in several embodiments, the host 500 continues to monitor the content device network for the addition and/or removal of content devices from the content device network.

Once the host 500 is aware of the available content devices, the host 500 generates in the display area 400 a graphical representation of two or more of the content devices that are coupled to the content device network (Step 604 of FIG. 6). The graphical representations in several embodiments are icons that are indicative of the content device that they represent. For example, with reference to FIG. 4 graphical representations of content devices are the hard drive icon 408, the optical drive icon 410 and the digital video recorder icon 412. It should be recognized that the graphical user interface shows a portion, but not necessarily all of the content devices that are a part of the content device network. In several embodiments, after the two or more of the content devices are graphically represented, the graphical user interface appears as illustrated and described with reference to FIG. 4 except that a content display window is not displayed.

When a user desires to view content from a particular content device, the user, according to several embodiments, simply clicks on either the host 406 icon or an icon representing the particular content device. As discussed with reference to FIG. 4, if the user elects to click on the host icon 406, the master menu box 418 is displayed allowing the user to select the particular content source from a content source menu within the content source menu box 420. Alternatively, as discussed further with reference to FIG. 8, if the user selects and clicks on the icon representing the particular content device, a content device menu box will be displayed that includes the content directory box 422 and the destination box 424.

After the user has selected a particular content device, the user may then select particular content, e.g., a particular program, available from the particular content device from the content directory box 422. Once the user selects a destination content device from the destination box 424, the host 500 then routes the particular content between the source content device and the destination content device. In addition, the host 500 generates a graphical representation of a content stream between the source content device and the destination content device (Step 606 of FIG. 6).

Figure 7:
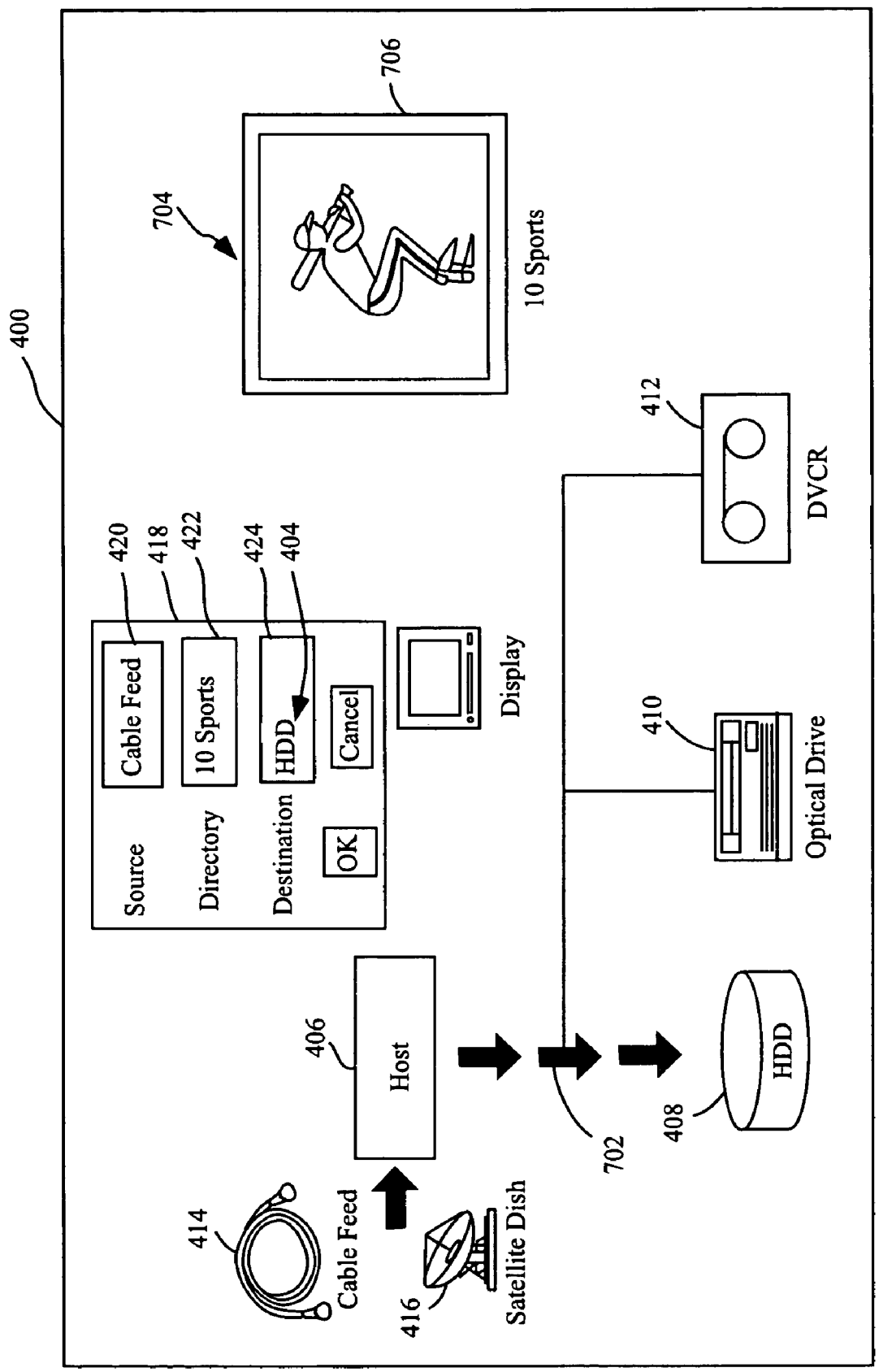
FIG. 7 is a graphical user interface of FIG. 4 in which a user has directed content from the cable feed to the hard drive.

For example, as shown in FIG. 7, which shows the graphical user interface of FIG. 4 in which a user has directed content from the cable feed 106 to the hard drive 108. FIG. 7 is the same as FIG. 4 except that within the master menu box 418 "cable feed" is shown within the content source selection box 420, "10 Sports" is shown in the content directory box 422, "HDD" is shown in the destination box 424, and "ok" and "cancel" buttons are shown in the master menu box 418. A graphical representation of a content stream 702 (also referred to as a content stream 702) is shown as a series of arrows between the cable feed icon 414 and the host icon 406 and also between the host icon 406 and the hard drive icon 408. In addition, a content display window 704 includes a frame 706.

The graphical user interface in FIG. 7 illustrates what is shown to the user after the user has clicked on the host icon 406 (to prompt a display of the master menu box 418), selected the cable feed 106 from the content source selection box 420, selected channel "10 Sports" from the content directory box 422 and selected the hard drive 108 from the destination box 424.

In response to the user's commands, the content stream 702 is displayed to indicate that there is a stream of content flowing from the cable feed 106 to the hard drive 108. The content stream 702 is shown as a series of arrows with each of the arrows pointing away from the cable feed icon 414 and toward the hard drive icon 408.

In several embodiments, the arrows 702 are shown with a particular graphical indicia that associates the content stream 702 with the content display window 704.

For example, FIG. 7 shows the content display window with the frame 706 having a pattern that matches a pattern of the content stream 702; thus, indicating that content displayed in the content display window 704 is the same content in the content stream 702, i.e., a baseball game, received from a content source designated by "10 Sports." Thus, in several embodiments, the host 500 generates a content display window 704 for displaying content that is associated with a particular content device (Step 608 of FIG. 6).

In several embodiments, in addition to, or instead of a pattern, the graphical indicia is a color and the frame 706 of the content display window 704 has the same color as the content stream 702 when content being displayed in the content display window 704 is the same content as that of the content stream 702. In some embodiments, the content device icons are also coded with a pattern and/or color to associate a particular content device with a content display window.

Thus, in several embodiments, there is an association between displayed content and a content stream so that the user is able to immediately determine from referencing the graphical user interface which content stream is being displayed in a content display window.

Beneficially, the host 500 and the graphical user interface are able to facilitate the transmission of multiple content streams between content devices. Thus, after a user has initiated a content stream, e.g., content stream 702, the user is able to initiate a second content stream by again selecting a source content device and a destination device.

Additionally, in several embodiments, one or more content devices may simultaneously receive and provide content. Thus, in some embodiments, where a user has already selected a particular content device to receive or provide content, e.g., hard drive 408, the user may again select the particular content device to either receive or provide content, and in response, the host 500 provides a second graphical representation of a content stream between the particular content device and another content device (Step 610 of FIG. 6).

For example, FIG. 8 shows one embodiment of the graphical user interface of FIG. 7 when the user has initiated a second content stream 802. FIG. 8 is similar to FIG. 7 except that the second content stream 802 is shown between the hard drive icon 408 and the host icon 406 as well as between the host icon 406 and the display icon 426. A second content display window 804 with a frame 806 is shown. Additionally, there is a primary device menu box 808 that has a playback button 810, an erase button 812 and an erase all button 814. Furthermore, the content directory box 422 and the destination box 424 are in a content device menu box 816 instead of the master menu box 418 of FIG. 7, and the content source selection box 420 is not shown. The "ok" button, the "cancel button" are also shown in the content device menu box 816.

The primary device menu box 808 in several embodiments is displayed in response to the user clicking on the hard drive icon 408, and provides a general menu of options for the user. For example, the user may erase a particular track of the hard drive 108 by pressing the erase button 812, or erase the entire hard drive by pressing the erase all button 814.

Alternatively, the user may press the playback button 810 to send content on the hard drive 108 to, e.g., the display 120 or another content device. In one embodiment, when the user presses the playback button 810 the content device menu box 816 is displayed. The content device menu box 816 provides functionality that is similar to the master menu box 418 except that the content device menu box 816 is displayed in response to the user directly pointing to and selecting a content device icon as a source content device instead of pointing to and selecting the host icon 406. Thus, the content source selection box 420 of the master menu box 418 is unnecessary because when the content device menu box 816 is displayed, the user has already selected a source content device by pointing to it and selecting it.

In other embodiments, the primary device menu box 808 is not displayed at all prior to a display of the content device menu 816. For example, when a content device is read only, the erase and erase all buttons 812, 814 of the primary device menu box 808 are likely an unnecessary option, and having the content device menu box 816 display immediately following the user's clicking of a content device icon is preferable.

The graphical user interface in FIG. 8 illustrates what is shown to the user after the user has clicked on the hard drive icon 408, then clicked on the play back button 810, then selected "Auto Racing" stored on "Track 2" of the hard drive 108 from the content directory box 422 and then selected the display 120 as a destination from the destination box 424.

In response to the user's commands directing content from "Track 2" of the hard drive to the display 120, the second content stream 802 is displayed to indicate that there is a stream of content flowing from the hard drive 108 to the display 120, and the second content display window 804 is displayed with auto racing shown therein. As shown, the second content stream 802 is represented by a second series of arrows, and each of the arrows points away from the hard drive icon 408 and towards the display icon 426. Additionally, the arrows of the second content stream 802 have a different pattern than the arrows representing the content stream 702 from the cable feed 106 to the hard drive 108. As shown, the frame 806 of the second content display window 804 has the same pattern as the pattern of the arrows making up the second content stream 802 to associate the auto racing content displayed in the second content display window 804 with the second content stream 702.

Thus, the user is immediately able to recognize that the hard drive 108 is both receiving content from the cable feed 106 and providing different content to the display 120. Additionally, the user is easily able to match a respective content stream to a respective content display window so that it is readily apparent to the user what content is being sent over each content stream.

It should be recognized that the primary device menu box 808 and the content device menu box 816 need not be displayed after a destination is selected for the content, and in several embodiments, both the primary device menu box 808 (if present) and the content device menu box 816 disappear once a user has clicked the "ok" button to affirm their selection or the "cancel" button to abort.

Figure 9:
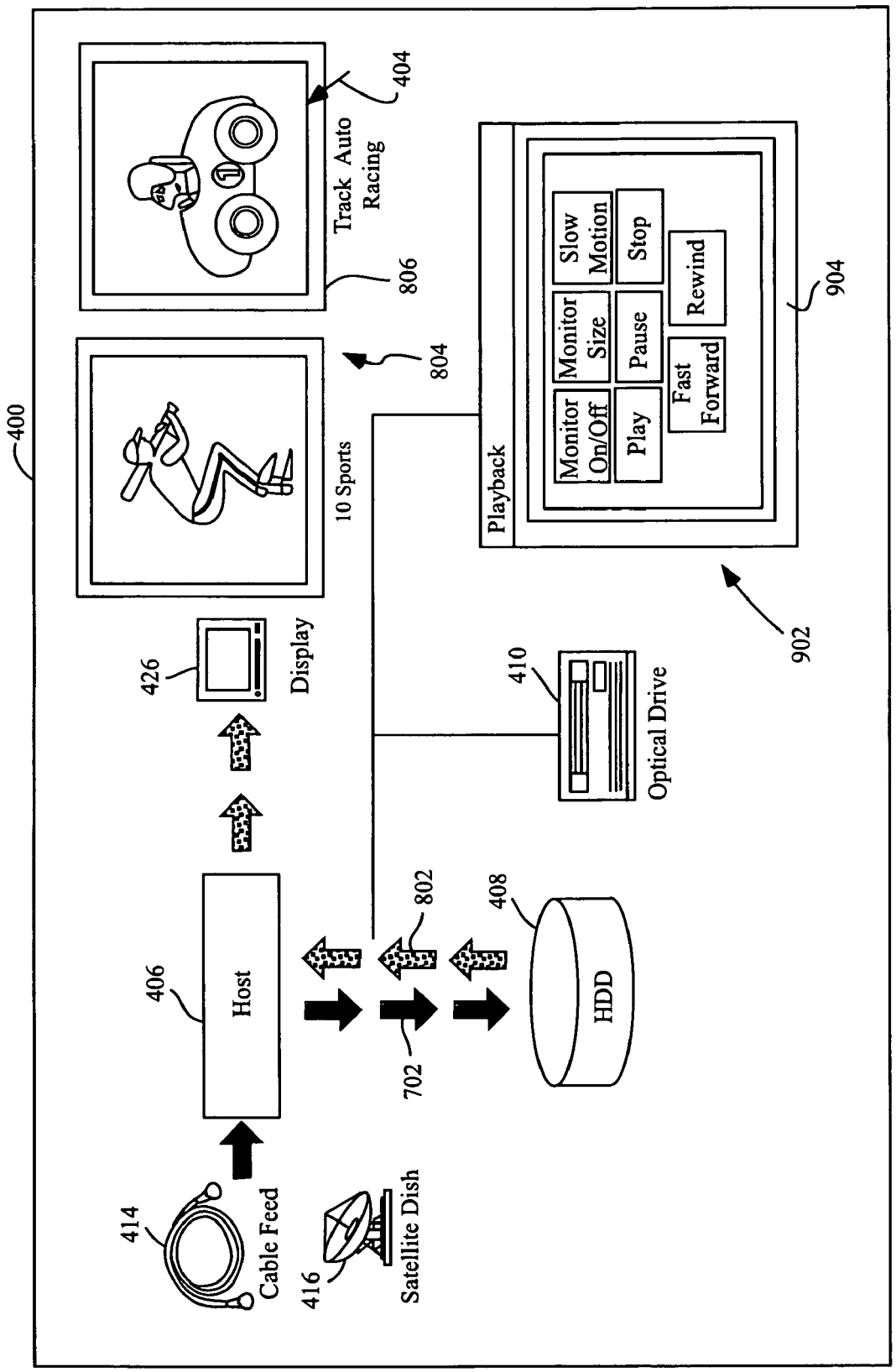
FIG. 9 is an embodiment of the graphical user interface of FIG. 8 illustrating a content control menu.

Referring next to FIG. 9, shown is an embodiment of the graphical user interface of FIG. 8 illustrating a content control menu. As shown, FIG. 9 is the same as FIG. 8 except that the primary device menu 808 and the content device menu box 816 are not shown, and instead, a content control menu box 902 is shown in the display 400. Within the content control menu box 902 are eight buttons that make up the content control menu of one embodiment: a "monitor on/off" button, a "monitor size" button, a "slow motion" button, a "play" button, a "pause" button, a "stop" button, a "play" button, a "fast forward" button and a "rewind" button. Also shown within the content control menu box 902 is a control menu frame 904 having the same pattern as the frame 806 of the second content display window 804. Additionally, the cursor 404 is shown pointing to the frame 806 of the second content display window 804.

The content control menu box 902 in general provides several options for controlling content displayed in a content display window, and in several embodiments, the content control menu box 902 is associated with a particular content stream and a particular content display window by graphical indicia. For example, as shown in FIG. 9, the content control menu box 902 is associated by a pattern with the second content display window 804 and the second content stream 802. In other embodiments, a content control menu is associated by color with its related content stream and content display window.

In operation, the user initiates a display of the content control menu box 902 by clicking either a content display window or a content stream. FIG. 9 shows the content control menu box 902 being displayed in response to the user clicking on the second content display window 804 using the cursor 404 guided by, e.g., the remote commander 530.

The "monitor on/off" button allows the user to remove the second content display window 804, and as discussed with reference to FIG. 10 the "monitor size" button allows the user to adjust the size of the second content display window 804. The "slow motion" and the "fast forward" buttons control the speed at which content in the second display window 804 is displayed, and in embodiments in which arrows of the content streams 702, 802 flash on and off, the arrows of the second content stream flash on and off at a reduced frequency when the "slow motion" button is used, and flash on and off with an increased frequency when the "fast forward" button is used during play of the content. When the "rewind" button is used, the arrows flash on and off with an increased frequency toward the revered direction.

Figure 10:
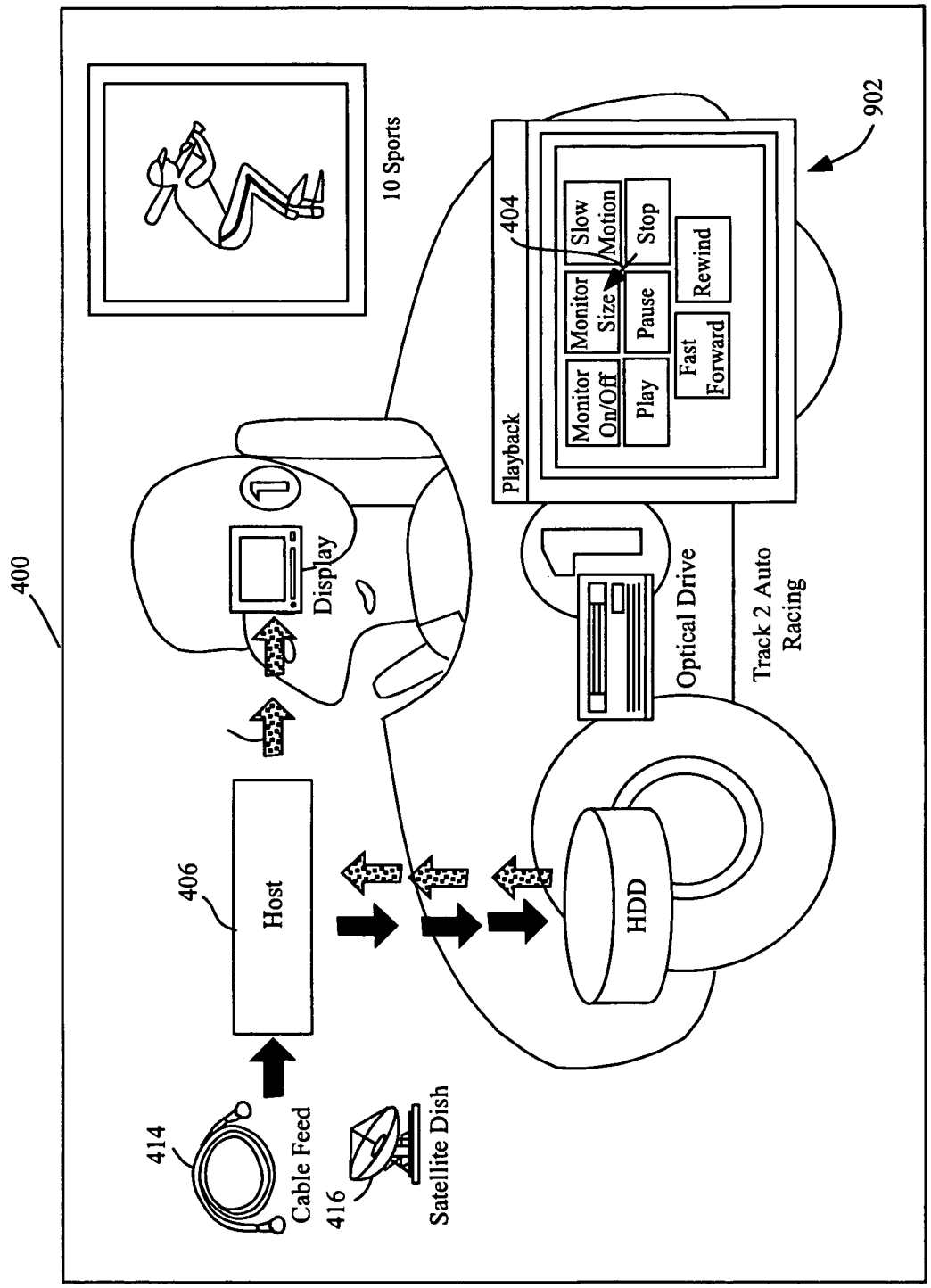
FIG. 10 is one embodiment of the graphical user interface of FIG. 9 illustrating the ability of the graphical user interface to resize content display windows.

Referring next to FIG. 10, shown is one embodiment of the graphical user interface of FIG. 9 illustrating the ability to resize content display windows. Shown in FIG. 10 are the same features as FIG. 9 except that the cursor 404 is shown selecting the "monitor size" button and the second content display window 804 has been enlarged to cover a much larger proportion of the display 400.

As shown, in FIG. 10, the second content display window 804 is enlarged in response to the user clicking on the "monitor size" button of the content control menu box 902. In some embodiments, the "monitor size" button toggles the size of the second content display window 804 between a full and a small size.

Figure 11:
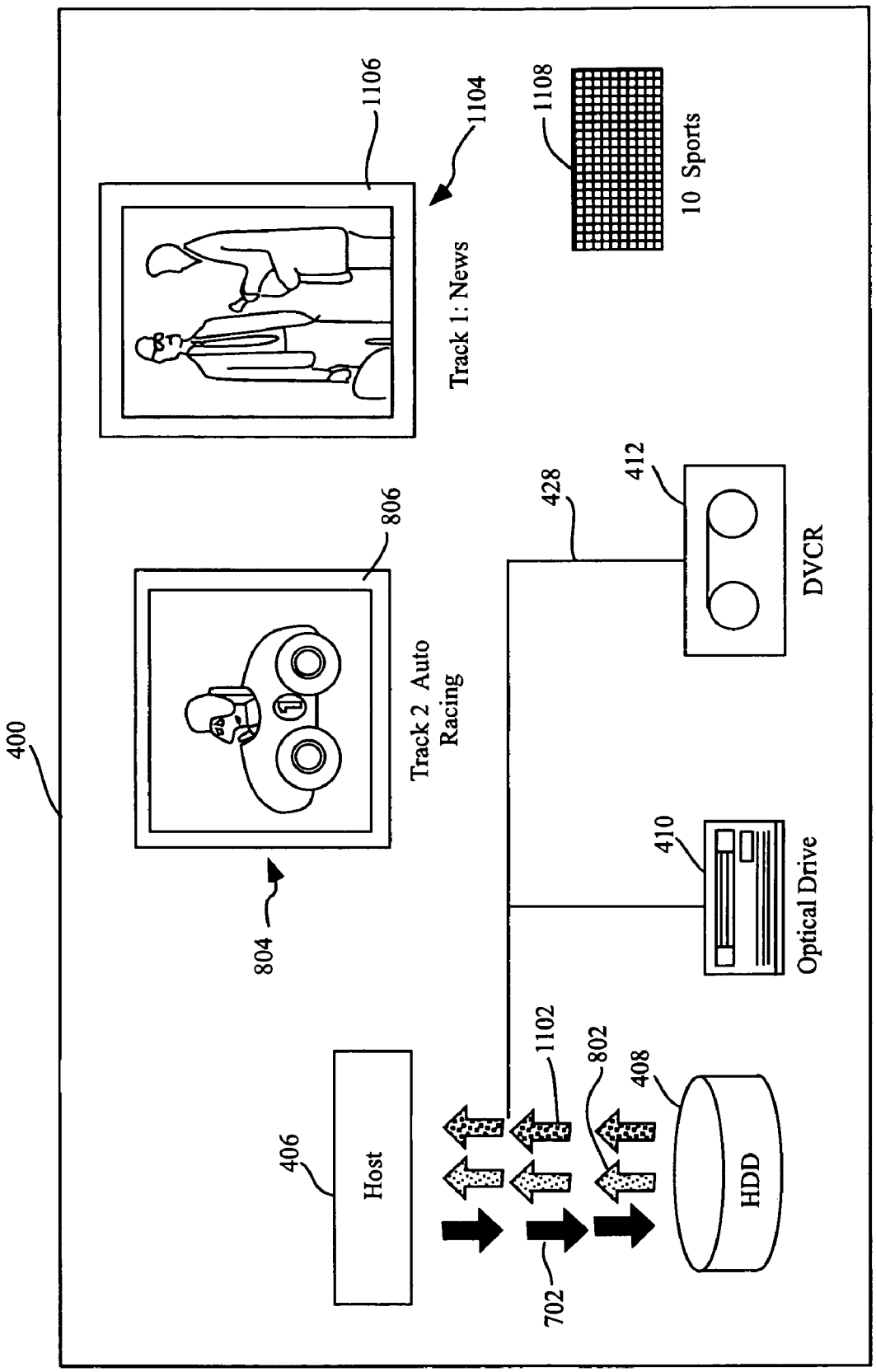
FIG. 11 is another embodiment of a graphical user interface displaying three content streams.

Referring next to FIG. 11, shown is another embodiment of a graphical user interface displaying three content streams. Shown are the host icon 406, the hard drive icon 408, the optical drive icon 410, the digital video recorder icon 412, the first content stream 702, the second content stream 802 and a third content stream 1102. Also shown are the second content display window 804, a third content display window 1104, a frame 1106 of the third content display window 1104 and a screen switch button 1108.

The first content stream 702 is shown as a series of arrows pointing away from the host icon 406 and towards the hard drive icon 408. The second and third content streams 802, 1102 are each shown as a series of arrows that are pointing away from the hard drive icon 408 and towards the host icon 406. The optical drive icon 410 and the digital video recorder 412 are shown coupled by the bus representation 428.

Respective arrows of the second and third content streams 802, 1102 have patterns matching the frames 806 of the second content display window 804 and the frame 1106 of the third content display window 1104 respectively. The first content stream 702 has a pattern that matches the screen switch button 1108.

As shown in FIG. 11, the third content stream 1102 has been initiated by the user that is directed from the hard drive icon 408 to the host icon 406, and content of the third content stream 1102, i.e., a "news" program stored on "track 1" of the hard drive 108, is displayed in the third content display window 1104.

In some embodiments, when more then two content streams are displayed in the graphical user interface, only two content display windows are provided. This may be preferable when screen space is too limited to fit the third content display window 1104, or may be necessitated by the number of decoders available to convert content streams into displayed video. The host 500, for example, has two video decoders, and thus, may only decode two video content streams at a time.

In several embodiments, when there are already two content streams established by the user and a third content stream is initiated by the user, a first initiated content display window is converted to a screen switch button, e.g., screen switch button 1108, and a new content display window displaying content of the third content stream is displayed. For example, as shown in FIG. 11, the first content display window 704 is no longer displayed and is converted to the screen switch button 1108, and the third content display window 1104 is displayed.

To view content of the first content stream 702 again, the user simply clicks on the screen switch button 1108, and the first content display window 704 will be displayed again, and the second content display window 804 will be converted to a screen switch button having a pattern that is the same as the second content stream 802 and the frame 806 of the second content display window 804. In this way, the graphical user interface allows the user to track and view several content streams when a limited number of content streams can be displayed at a time.

It should be recognized, however, that in other embodiments the host 304 has more than two video decoders, e.g., four or more video decoders, and in the other embodiments more than two content display windows may display content of more than two content streams.

Providing multiple content display windows, however, occupies space within the display 400, and in some embodiments, to provide more space in the display 400 some content device icons are not displayed. For example, as shown in FIG. 11, the cable feed icon 414, satellite feed icon 416, and display icon 426 are not shown. Eliminating these icons typically does not present a problem to the user because, in several embodiments, any content stream that is directed to the host 500 is available at the display 426, and the cable feed 106 and satellite feed 104 are controllable from the master menu box 418.

Figure 12:
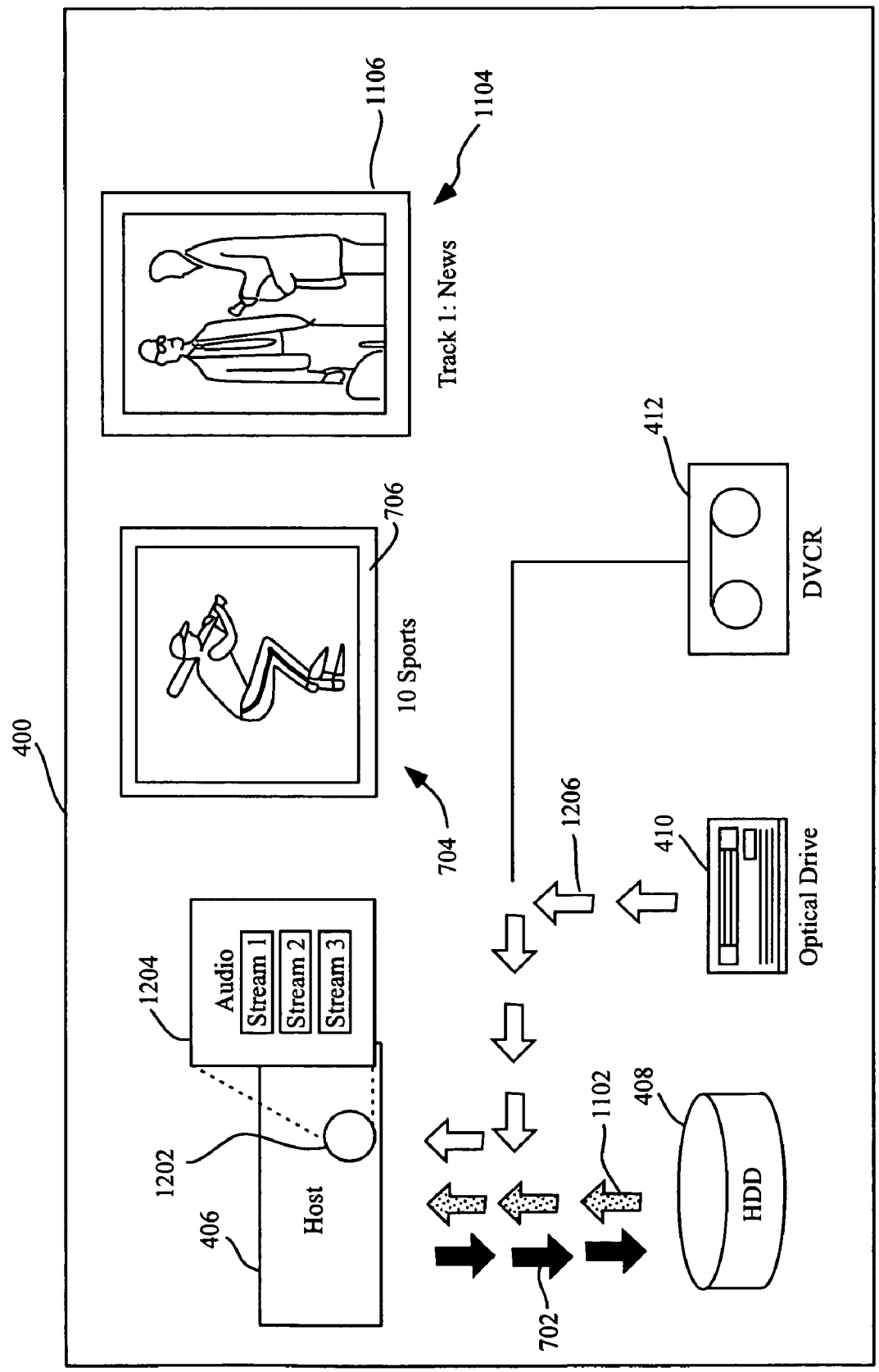
FIG. 12 is another embodiment of the graphical user interface illustrating an audio selection icon.

Referring next to FIG. 12, shown is another embodiment of the graphical user interface illustrating an audio selection icon 1202. Shown are the host icon 406, first content display window 704, an audio selection icon 1202 and an audio menu box 1204 with a "stream 1" button, a "stream 2" button and a "stream 3" button. Also shown is an audio content stream 1206 between the optical drive icon 410 and the host icon 406. Otherwise, FIG. 12 is the same as FIG. 11 except the second content stream 802 and the screen switch button are not shown 1108. In some embodiments, each of a "stream 1", a "stream 2" and a "stream 3" button is shown with a graphical indicia that associates the content stream.

In several embodiments, the audio selection icon 1202 indicates what content stream's audio component is being monitored. Additionally, the audio menu box 1204 is displayed in response to the user clicking on the audio selection icon 1202; thus allowing the user to select a content stream the user wants to listen to. For example, as shown in FIG. 12, the audio selection icon 1202 is shown within the host icon 406 above the audio content stream 1206 to indicate that audio, e.g., music, of the audio content stream 1206 is being monitored, e.g., provided to the speakers of the display 120 or other audio system.

Thus, the graphical user interface allows the user to conveniently monitor audio content of each of the content streams 702, 1102, 1206 while simultaneously viewing video content of two or more video content streams, e.g., the first and third content streams 702, 1102.

In several embodiments, the audio selection icon 1202 is positioned, by default, to monitor a most recently initiated content stream so that the user need not undertake a separate command to synchronize audio and video of the most recently initiated content stream.

Although the audio menu box 1204 is displayed allowing the user to select, via a menu, a content stream to monitor, it should be recognized that in some embodiments, the user is able to click and drag the audio selection icon 1202 so that it is positioned above a content stream that the user desires to monitor.

Figure 13:
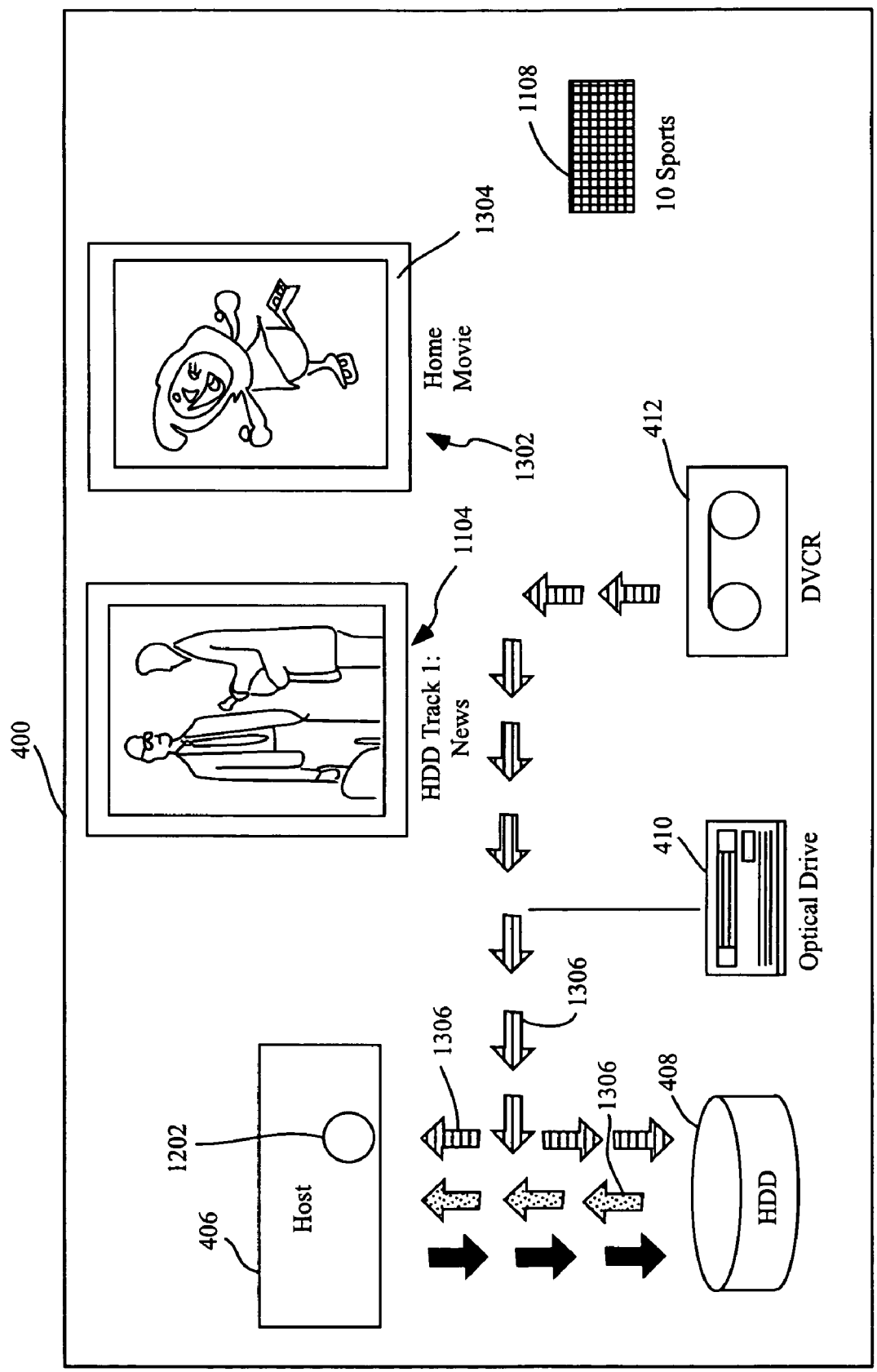
FIG. 13 is another embodiment of a graphical user interface illustrating monitoring of a content stream between two local content devices.

Referring next to FIG. 13, shown is another embodiment of a graphical user interface illustrating monitoring of a content stream between two local content devices. Shown in. FIG. 13 are the same features of FIG. 12 except the audio menu box 1204 and the audio content stream 1206 are not shown, and in addition, a DVCR display window 1302, a frame 1304 of the DVCR content display window 1302, a DVCR content stream 1306 and the screen switch button are shown 1108.

The DVCR content stream 1306 is shown as a series of arrows pointing away from the DVCR icon 412 towards both the hard drive icon 408 and the host icon 406, and as the DVCR content stream 1306 approaches the hard drive icon 408 and host icon 406, the DVCR content stream 1306 is shown splitting with arrows that point to both the host icon 406 and the hard drive icon 1306.

In operation, the user is able to first direct content from one local content device, i.e., a content device coupled with the communication bus 302, to another local content device and then monitor the content. For example, as shown by the DVCR content stream 1306, content from the DVCR content device 112 has been directed to the hard drive 108 and the host 500. In several embodiments, the user initiates content stream 1306 with two steps. First, the user directs content from the DVCR content device 112 by, e.g., clicking on the host icon 406 and using a master menu box, e.g., master menu box 418, or by clicking on the DVCR icon 412 and using a content device menu as described with reference to FIG. 8. Second, the user then directs the same content from the DVCR content device 112 to the host 500.

As shown in FIG. 13, in response to the user both directing content from the DVCR content device 112 to the host 500 and the hard drive 108, the DVCR display window 1302 displays content of the DVCR content stream 1306 and the DVCR content stream 1306 indicates that content is both moving locally, i.e., via the communication bus 302, from the DVCR content device 112 to the hard drive 108, and from the DVCR content device 112 to the host 500, and hence, the display 120.

Figure 14:
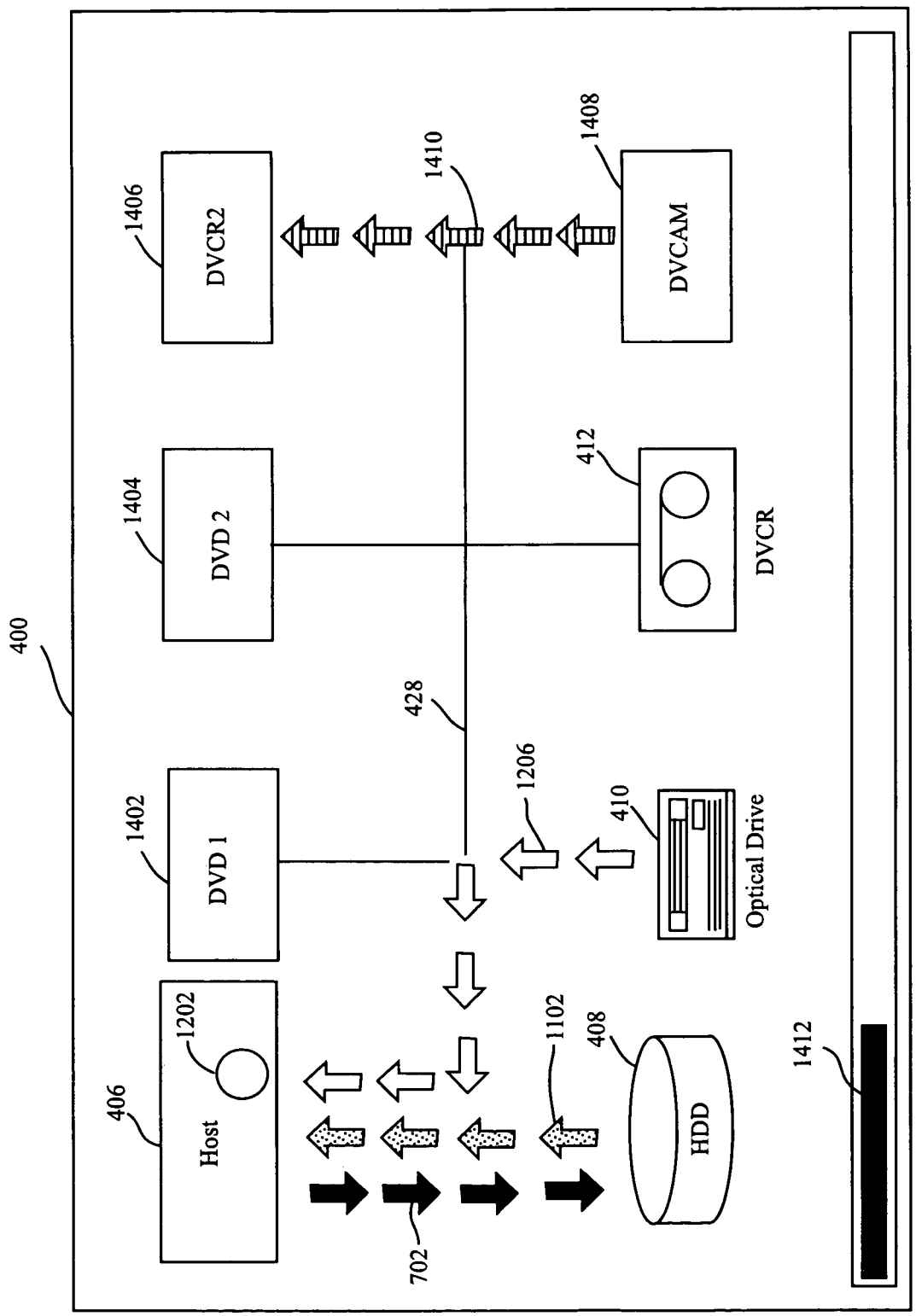
FIG. 14 is one embodiment of the graphical user interface in which several content device icons are displayed.

Referring next to FIG. 14, shown is one embodiment of a graphical user interface in which several content device icons are displayed. Shown are the host icon 406, the hard drive icon 408, the optical drive icon 410, the DVCR icon 412, a first DVD icon 1402, a second DVD icon 1404, a second DVCR icon 1406 and a digital video camera (DVCAM) icon 1408. Also shown are the first content stream 702, the third content stream 1102, the audio content stream 1206 and a DVCAM content stream 1410. Additionally shown is a scroll bar 1412 at a left portion of the display 400.

The host icon 406, the hard drive icon 408, optical drive icon 410 and DVCR icon 412 as well as the first, third and audio content streams 702, 1102, 1206 are shown arranged in the same manner as FIG. 12. The first DVD icon 1402, the second DVD icon 1404 and the DVCR icon 412 are shown coupled with the bus representation 428 and do not have content streams associated with them. The digital video camera icon 1408 and the second digital video recorder icon 1406 are shown with the digital video camera content stream 1410 between them with arrows that make up the digital video camera content stream 1410 pointing towards the second digital video recorder icon 1406.

In operation, as shown in FIG. 14, when there are several content devices represented in the graphical user interface, as many content devices that reasonably fit in the display area may be displayed at a time. Additionally, content display windows may be minimized so that content device icons are not obstructed.

As shown in FIG. 14, the digital video camera content stream 1410 is not directed to the host icon 406 at all, and thus, the graphical user interface allows the user to control the digital video camera content stream 1410 by, e.g., a content control menu box, without viewing the digital video camera content stream 1410.

In some embodiments, e.g., embodiments using the host 500 described with reference to FIG. 5, only three content streams may enter or leave the host 500 at a given time, and thus, the user is not be able to view content of the digital video camera content stream 1410 without first discontinuing one of the first, third or audio content streams 702, 1102, 1206. In such a case, according to one embodiment, if the user attempts to direct the digital video camera content stream 1410 to the host 500, a message is displayed informing the user that too many content streams are being routed through the host 500. As previously discussed, however, the present invention is not limited to host devices that only handle three content streams, and one of ordinary skill in the art recognizes that the host 500 described with reference to FIG. 5 is adaptable with additional and/or different hardware to accommodate more than three content streams.

In several embodiments, when there are too many content device icons in a content device network to be effectively displayed in the display 400 at once, the scroll bar 1412 allows a user to move the graphical user interface so that the entire graphical user interface may be viewed in portions.

Figure 15:
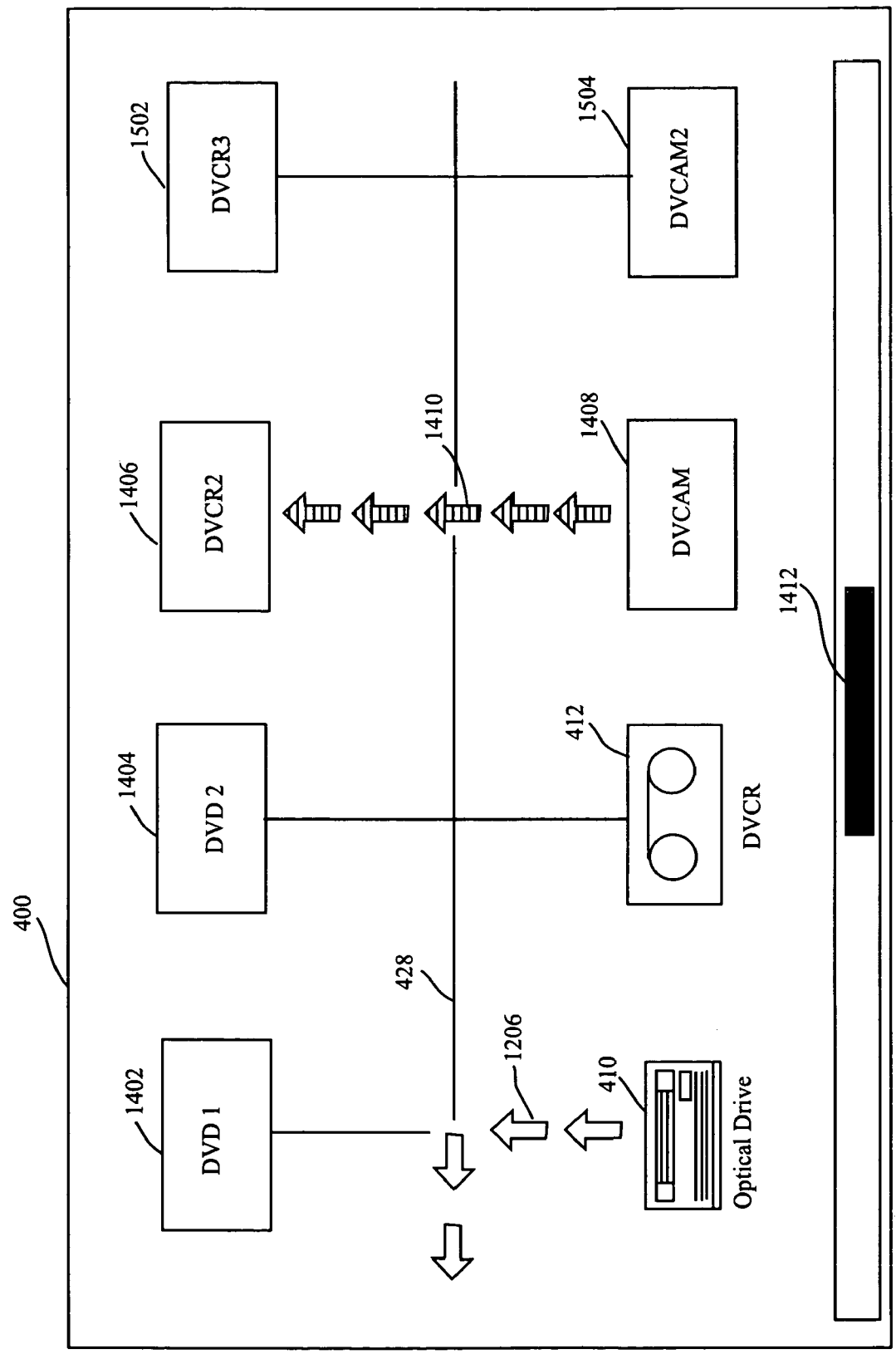
FIG. 15 is an embodiment of the graphical user interface of FIG. 14 in which the scroll bar is used to show previously unseen content device icons.

For example, FIG. 15 shows an embodiment of the graphical user interface of FIG. 14 in which the scroll bar 1412 is used to show previously unseen content device icons. Shown in the display 400, in response to the user moving the scroll bar 1412 from the left portion of the display 400 to a center portion of the display 400, is a portion of the graphical user interface showing two other content device icons: a third DVCR icon 1502 and a second digital video camera icon 1504. Not shown in the display 400 are the host icon 406, the hard drive icon 408, the first content stream 702, the third content stream 1102 and a portion of the audio content stream 1206.

As shown in FIG. 15, the scroll bar 1412 allows the user to scroll across the graphical user interface to view content device icons and/or content streams that were previously unseen, e.g., the third DVCR icon 1502 and the second digital video camera icon 1504.

Figure 16:
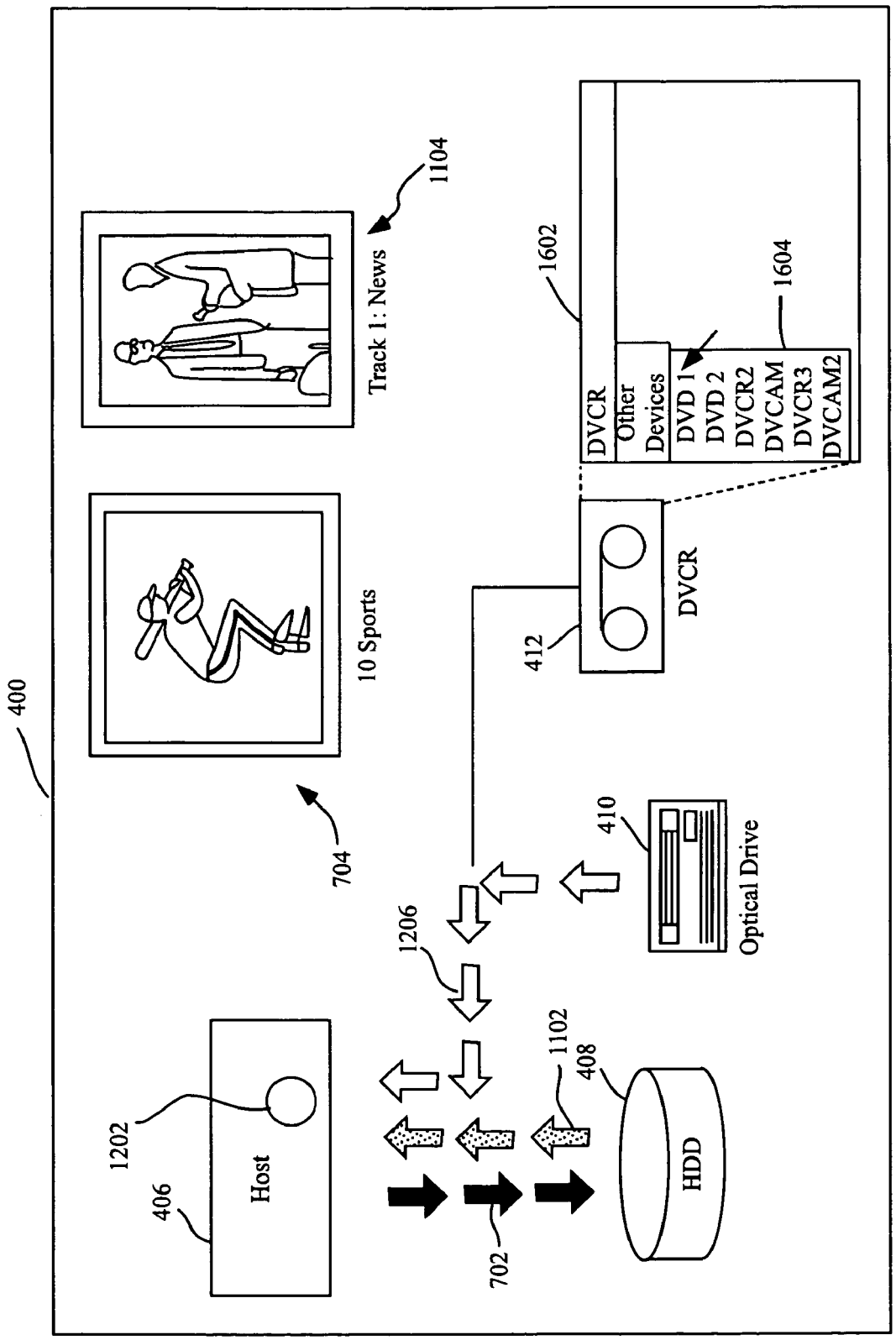
FIG. 16 is another embodiment of a graphical user interface in which a content device menu is used to perform an icon swap.

Referring next to FIG. 16, shown is another embodiment of a graphical user interface in which a content device menu is used to perform an icon swap. Shown in FIG. 16 are the same features of FIG. 12, and in addition, a content device menu box 1602 for the DVCR content device 112 is shown. Within the content device menu box 1602 is an "other devices" button, and a pull down menu 1604 from the "other devices" button is shown with a "DVD 1" option, a "DVD 2" option, a "DVCR 2" option, a "DVCAM" option, a "DVCR 3" option, and a "DVCAM 2" option.

In the present embodiment, content devices represented in the graphical user interface of FIGS. 14 and 15 are a part of a content device network that is represented in FIG. 16, however, only the hard drive icon 408, the optical drive icon 410 and the DVCR icon 412 are shown in the display 400 of FIG. 16.

In operation, according to the present embodiment, when the user desires to view a content device icon that cannot be seen in the display 400, the user is able to swap a displayed content device icon for another content device icon that is not displayed. For example, as shown in FIG. 16, if the user desires to swap the DVCR icon 412 for the first DVD icon 1402, the user simply clicks on the DVCR device icon 412, and the content device menu box 1602 for the DVCR icon 412 is displayed. The user is then able to click on the "other devices" button and select the "DVD 1" option to swap the DVCR icon 412 for the first DVD icon 1402.

Thus, space in the display 400 is saved, allowing more room for content device windows, by displaying only a few content device icons, and the user is still able to control all content devices by performing an icon swap operation.

The content device menu box 1602 for the DVCR device 112, in several embodiments, also includes the content source selection box 420 and the destination box 424 (not shown) that are described with reference to FIGS. 4 and 8.

Figure 17:
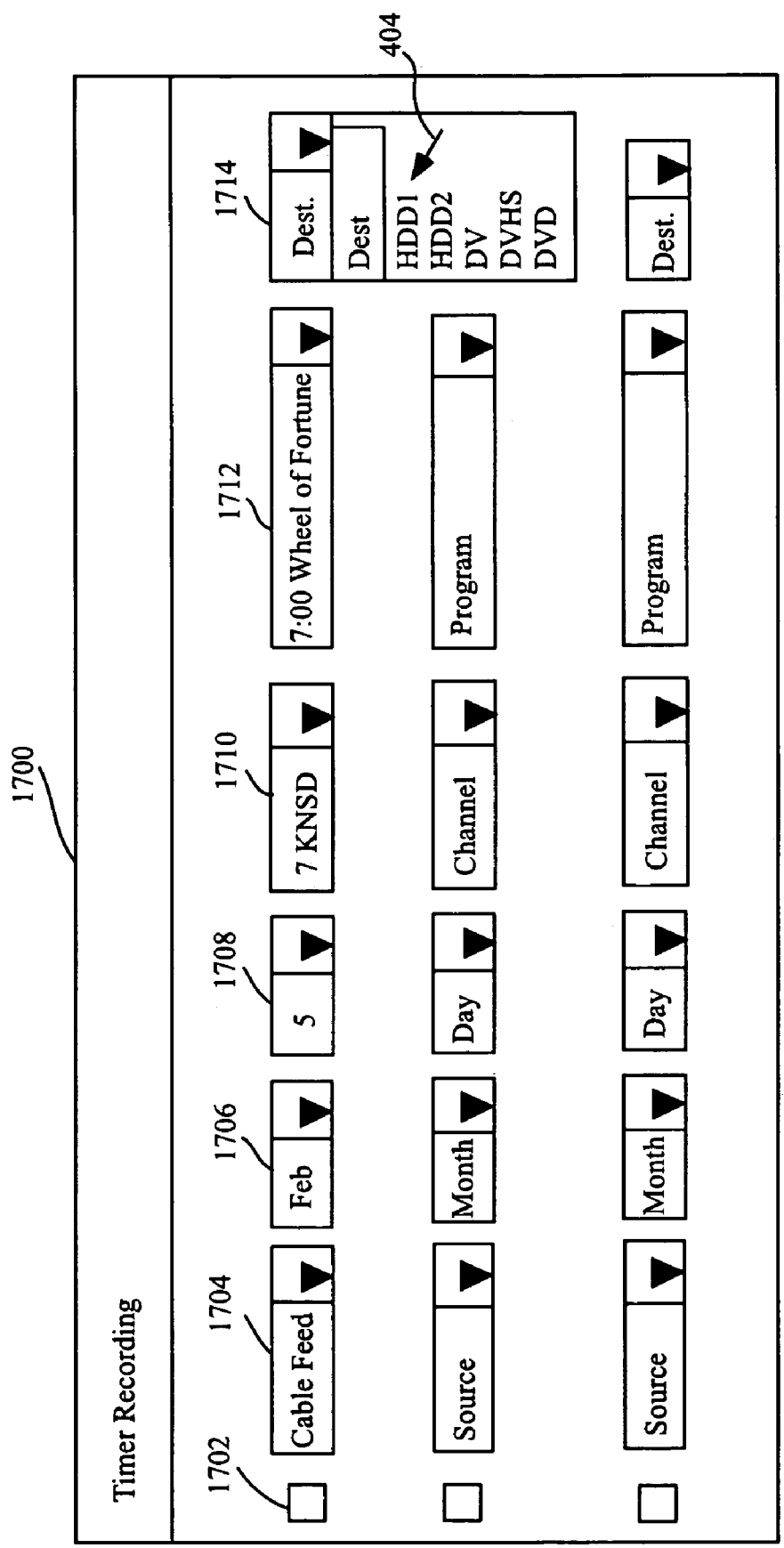
FIG. 17 is a timer recording panel 1700 illustrating the expandability of the graphical user interface.

Advantageously, other sub-menus may be added to expand the capabilities of the graphic user interface. For example, FIG. 17 shows is a timer recording panel 1700 illustrating the expandability of the graphical user interface. Shown is the timer recording panel 1700 and within the timer recording panel are three separate recording information menus, and within each recording information menu is a collection of pull-down menus including a check box 1702, a source menu 1704, a month menu 1706, a day menu 1708, a channel menu 1710, a channel sub-menu 1712 and a destination menu 1714.

The timer recording panel 1700 in several embodiments is easily implemented as a sub menu option within a master menu box (e.g., master menu box 418) and/or within a content device menu box (e.g., content device menu box 816). One of ordinary skill in the art recognizes that timed recording functionality may be implemented by using a CPU with an internal timer as the CPU 517 in the host 500.

In operation, to set up recording of a future program, the user simply selects a source, a date, a channel number, a program and a destination from each of the respective source, month, day, channel, channel sub-menu and destination menus 1704, 1706, 1708, 1710, 1712, 1714. The destination menu 1714 shows content devices in a content device network that are available to record the selected content. For example, as shown in FIG. 17, the cable feed 106 has been selected in the source menu 1704, "February" and "5th" has been selected from the month and day menus 1706, 1708 respectively, "7 KNSD" has been selected in the channel menu 1710, "7:00 Wheel of Fortune" has been selected in the channel submenu 1712, and the cursor 404 is shown next to "HDD1" is the destination menu 1714.

When the user has completed making their desired selections, the user checks the check box 1702 to indicate a timed recording is set, and to cancel a timed recording, the user simply un-checks the check box 1702.

While the invention herein disclosed has been described by means of specific embodiments and applications thereof, numerous modifications and variations could be made thereto by those skilled in the art without departing from the scope of the invention set forth in the claims.

What is claimed is:

1. A system comprising:
   a host adapted to receive content from a plurality of source content devices;
   a display area coupled to the host;
   a graphics engine for causing graphical representations of the plurality of source content devices to be displayed on the display area and further for causing animated graphical representations of one or more content streams between the source content devices to be displayed on the display area; and
   a plurality of content display windows individually configured to simultaneously display content provided by one of the plurality of source content devices on the display area;
   wherein the content displayed in each of the plurality of windows is content provided by a different source content device; and
   wherein at least one of the plurality of content display windows displaying the content provided by a corresponding one of the plurality of source content devices and the graphical representations of the plurality of source content devices are simultaneously displayed in the display area.

2. The system of claim 1, wherein the graphical representations of the plurality of source content devices show how the plurality of source content devices are being used.

3. The system of claim 1 wherein the system comprises a television.

4. The system of claim 3 wherein the television is a high definition television.

5. The system of claim 1 wherein the system comprises a personal computer.

6. The system of claim 1 further comprising a remote commander.

7. The system of claim 6 wherein the remote commander is a remote control.

8. The system of claim 6 wherein the remote commander is a mouse.

9. The system of claim 1 wherein the host and the display area are integrated within a single device.

10. The system of claim 1 wherein the host and the display are located in separate devices.

11. The system of claim 1 wherein the host transmits the content from the plurality of source content devices to the display area.

12. The system of claim 1 wherein the display area is a television screen.

13. The system of claim 1 wherein the display area is a personal computer monitor.

14. The system of claim 1 wherein the graphics engine is further adapted to cause a further representation of the plurality of source content devices to be displayed within a master menu box on the display area.

15. The system of claim 14 wherein the master menu box further comprises:
   a content source selection box including a content source selection menu, and
   a content directory box including the content for a directory of a selected source content device.

16. The system of claim 1 wherein the graphics engine is further adapted to cause graphical representations to be displayed on the display area, the graphical representations comprising:
   a host icon for initiating a master menu box;
   a plurality of content device icons; and
   a cursor for selecting the plurality of content device icons.

17. A system for managing content devices through a graphical interface comprising:
   a display area;
   a plurality of windows configured to be displayed on the display area;
   a plurality of source content devices for supplying content to the display area;
   a host coupled to the display area, the host adapted to generate graphical representations of the source content devices and generate animated graphical representations of one or more content streams between the source content devices, to transmit the content between the source content devices and the display, and to cause the content supplied by the plurality of source content devices to be simultaneously displayed within a separate one of the plurality of windows; and
   a remote commander for sending a command signal to the host, wherein the host initializes a menu in response to receiving the command signal, wherein the menu is a graphical representation of the plurality of source content devices.

18. The system of claim 17, wherein the graphical representation of the plurality of source content devices shows how the plurality of source content devices are being used.

19. The system of claim 17 wherein the host and the display are located in separate devices.

20. The system of claim 17 wherein the host and the display area are integrated in a single device.

21. The system of claim 20 wherein the single device comprises a television.

22. The system of claim 21 wherein the television is a high definition television.

23. The system of claim 20 wherein the single device comprises a personal computer.

24. The system of claim 17 wherein the remote commander is a remote control.

25. The system of claim 17 wherein the remote commander is a mouse.

26. The system of claim 17 wherein the display area is a television screen.

27. The system of claim 17 wherein the display area is personal computer monitor.

28. The system of claim 17 wherein the content is transmitted through the host.

29. The system of claim 17 wherein the display area represents a state of the source content device.

30. The system of claim 17 wherein the system further comprises a plurality of destination content devices for receiving the content.

31. The system of claim 30 wherein the plurality of destination content devices are selected from the group consisting of televisions, optical disk drives, hard drives, DVD players, digital video recorders and digital video cameras.

32. The system of claim 17 wherein the plurality of source content devices are selected from the group consisting of televisions, optical disk drives, hard drives, compact disk players, DVD players, digital video recorders, digital video cameras, internet feed, cable feed, and satellite feed.

33. The system of claim 17 wherein the host further comprises a graphics engine for causing graphical representations of the plurality of source content devices to be displayed on the display area.

34. The system of claim 33 wherein the graphics engine is further adapted to cause:
   a further representation of the plurality of source content devices to be displayed within a master menu box on the display area.

35. The system of claim 34 wherein the master menu box further comprises:
   a content source selection box having a content source selection menu; and
   a content directory box having the content for a particular source content device.

36. The system of claim 17 wherein the display area further comprises:
   a host icon for initiating the master menu box;
   a plurality of content device icons; and
   a cursor for selecting the plurality of content device icons.

37. The system of claim 34 wherein a first graphical representation of the plurality of graphical representations is one color, and a second graphical representation of the plurality of graphical representations is second color.

38. The system of claim 17 further comprising a plurality of communication paths.

39. The system of claim 38 wherein the plurality of communication paths is a wired network.

40. The system of claim 39 wherein the wired network is implemented with conductors selected from the group consisting of coaxial, twisted pair wiring, and optical coupling.

41. The system of claim 38 wherein the series of communication paths is a wireless network.

42. The system of claim 41 wherein the wireless network is a wireless indoor local area network.

43. A method for delivering instructions comprising the steps of:
   detecting a first selection of an input source on a remote commander;
   transmitting a first signal from the remote commander in response to detecting the first selection, the signal for causing a graphical representation upon a display area of how a plurality of source content devices are being used comprising one or more animated content streams between the source content devices;
   detecting a second selection of a host icon selection input on the remote commander; and transmitting a second signal from the remote commander, in response to detecting the second selection, the signal for causing a selection of a host icon within the display area for initiating a master menu box depicting data associated with each of the plurality of source content devices;

wherein the master menu box contains a content directory box; and wherein the content directory box displays a listing of available content from at least one of the plurality of source content devices as selected through the source box.

44. The method of claim 43 further comprising:

detecting a third selection on a remote commander; and transmitting a third signal from the remote commander, the signal for causing a selection of a selected source content device from a content source selection menu within the master menu box.

45. The method of claim 43 wherein the step of detecting a first selection of an input source on a remote commander further comprises detecting a button on a remote control.

46. The method of claim 43 wherein the step of detecting a first selection of an input source on a remote commander further comprises detecting a button on a mouse.

47. A method for managing content devices through a graphical interface comprising the steps of:

receiving a command signal from a remote commander;

displaying on a display area a graphical representation of how a plurality of source content devices are being used comprising one or more animated content streams between the source content devices; and causing content supplied by the plurality of source content devices to be simultaneously displayed within a separate one of a plurality of windows on the display area;

wherein the content displayed in each of the plurality of windows is content provided by a different source content device; and wherein at least one of the plurality of content display windows displaying the content provided by a corresponding one of the plurality of source content devices and the graphical representations of the plurality of source content devices are simultaneously displayed in the display area.

48. The method of claim 47 wherein the step of receiving the command signal from the remote commander includes receiving the command signal by an interface module located within a host.

49. The method of claim 48 wherein the step of receiving the command signal from the remote commander by the interface module located within the host includes receiving the command signal by a CPU through an internal bus.

50. The method of claim 49 wherein the step of receiving the command signal from the remote commander includes the CPU obtaining audio and video packet identification numbers from program information data for generating the graphical representations on the display area.

* * * * *